(12) United States Patent
Kashiwagi et al.

(10) Patent No.: US 10,211,633 B2
(45) Date of Patent: Feb. 19, 2019

(54) POWER DISTRIBUTION MANAGEMENT APPARATUS, PATTERN EXTRACTION METHOD, AND RECORDING MEDIUM

(71) Applicant: FUJITSU LIMITED, Kawasaki-shi, Kanagawa (JP)

(72) Inventors: Tetsuya Kashiwagi, Fukuoka (JP); Yuichi Matsufuji, Fukuoka (JP)

(73) Assignee: FUJITSU LIMITED, Kawasaki (JP)

( * ) Notice: Subject to any disclaimer, the term of this patent is extended or adjusted under 35 U.S.C. 154(b) by 448 days.

(21) Appl. No.: 14/674,610

(22) Filed: Mar. 31, 2015

(65) Prior Publication Data

US 2015/0207321 A1     Jul. 23, 2015

Related U.S. Application Data

(63) Continuation of application No. PCT/JP2012/075437, filed on Oct. 1, 2012.

(51) Int. Cl.
*H02J 3/00* (2006.01)
*H02J 13/00* (2006.01)
(Continued)

(52) U.S. Cl.
CPC ............... *H02J 3/00* (2013.01); *G05B 15/02* (2013.01); *G06Q 10/06* (2013.01); *G06Q 50/06* (2013.01);
(Continued)

(58) Field of Classification Search
None
See application file for complete search history.

(56) References Cited

U.S. PATENT DOCUMENTS 6,191,500 B1 * 2/2001 Toy .......................... H02J 3/46
307/64
2003/0083788 A1   5/2003 Harada et al.
(Continued)

FOREIGN PATENT DOCUMENTS

EP    2226754 A1    9/2010
JP    3141164       3/2001
(Continued)

OTHER PUBLICATIONS

Extended European Search Report dated Dec. 1, 2015 for corresponding European Patent Application No. 2886138.2, 8 pages.
(Continued)

*Primary Examiner* — Jason Lin
(74) *Attorney, Agent, or Firm* — Fujitsu Patent Center

(57) ABSTRACT

A power distribution management apparatus includes: a memory configured to store history information including a pattern of open and closed states of switches that switch a path that supplies power between a substation and load equipment of a customer, and attribute information related to an environment where the power is supplied; and a processor configured to execute a process. The process includes: upon acceptance of specification of the attribute information related to the environment, calculating a degree of similarity between the specified attribute information and attribute information included in the history information; and extracting a pattern of the open and closed states of switches whose degree of similarity satisfies a predetermined condition among the history information.

11 Claims, 22 Drawing Sheets

(51) Int. Cl.
  *G06Q 50/06* (2012.01)
  *G06Q 10/06* (2012.01)
  *G05B 15/02* (2006.01)
(52) U.S. Cl.
  CPC .......... *H02J 3/005* (2013.01); *H02J 13/0006* (2013.01); *Y02E 60/723* (2013.01); *Y04S 10/16* (2013.01)

(56) References Cited

U.S. PATENT DOCUMENTS

| | | | | |
|---|---|---|---|---|
| 2012/0205981 A1* | 8/2012 | Varma | ....................... | H02J 3/01 307/64 |
| 2012/0232706 A1* | 9/2012 | Hayashida | .......... | F24D 19/1039 700/282 |
| 2013/0024045 A1* | 1/2013 | Fujiwara | ................... | H02J 3/46 700/297 |
| 2013/0035802 A1* | 2/2013 | Khaitan | ................. | G06F 1/263 700/297 |
| 2013/0063273 A1* | 3/2013 | Bhageria | ................ | G08B 21/00 340/653 |
| 2013/0282189 A1* | 10/2013 | Stoupis | .................... | H02J 3/00 700/286 |
| 2014/0081472 A1* | 3/2014 | Bates | .................. | H02J 13/0006 700/286 |
| 2015/0074431 A1* | 3/2015 | Nguyen | .................. | H02J 3/006 713/300 |

FOREIGN PATENT DOCUMENTS

| | | |
|---|---|---|
| JP | 2005-237187 | 9/2005 |
| JP | 2007-037315 | 2/2007 |
| JP | 3984604 | 10/2007 |
| JP | 2012-029412 | 2/2012 |
| JP | 2012-044740 | 3/2012 |

OTHER PUBLICATIONS

International Search Report, mailed in connection with PCT/JP2012/075437 dated Jun. 18, 2013.

* cited by examiner

FIG.4

| POSITION ID | POSITION TYPE | LATITUDE | LONGITUDE |
|---|---|---|---|
| SS0001 | SS | 502723016 | 128084866 |
| PO0001 | POLE | 502723021 | 128084176 |
| PO0002 | POLE | 502723031 | 128083227 |
| PO0003 | POLE | 502724066 | 128083262 |
| PO0004 | POLE | 502725091 | 128083296 |
| PO0005 | POLE | 502726033 | 128083331 |
| PO0006 | POLE | 502726840 | 128083382 |
| PO0007 | POLE | 502727844 | 128083430 |
| PO0008 | POLE | 502728620 | 128083503 |
| LL0001 | LOADL | 502728677 | 128083736 |
| PO0009 | POLE | 502729231 | 128083641 |
| PO0010 | POLE | 502729304 | 128084383 |
| PO0011 | POLE | 502729179 | 128084814 |
| LL0002 | LOADL | 502729402 | 128085012 |
| PO0012 | POLE | 502728879 | 128085361 |
| PO0013 | POLE | 502728620 | 128085900 |
| LL0003 | LOADL | 502729298 | 128086064 |
| LL0004 | LOADL | 502729174 | 128086288 |
| LL0005 | LOADL | 502729133 | 128085547 |
| PO0014 | POLE | 502725019 | 128082520 |
| LL0006 | LOADL | 502724661 | 128082339 |
| PO0015 | POLE | 502725112 | 128081757 |
| PO0016 | POLE | 502725122 | 128081244 |
| LL0007 | LOADL | 502724765 | 128081321 |
| LL0008 | LOADL | 502724744 | 128081718 |

FIG.5

| EQUIPMENT ID | POSITION ID | TYPE | ATTRIBUTE INFORMATION |
|---|---|---|---|
| PO0001 P1 | PO0001 | POLE | ... |
| PO0001 01 | PO0001 | SW | ... |
| PO0002 P1 | PO0002 | POLE | ... |
| PO0003 P1 | PO0003 | POLE | ... |
| PO0004 P1 | PO0004 | POLE | ... |
| PO0004 01 | PO0004 | SW | ... |
| PO0005 P1 | PO0005 | POLE | ... |
| PO0006 P1 | PO0006 | POLE | ... |
| PO0007 P1 | PO0007 | POLE | ... |
| PO0007 01 | PO0007 | BANK | RESISTANCE (36800Ω), REACTANCE (31300Ω), VOLTAGE RATIO 1 |
| PO0008 P1 | PO0008 | POLE | ... |
| LL0001 01 | LL0001 | LOADL | ... |
| PO0009 P1 | PO0009 | POLE | ... |
| PO0009 01 | PO0009 | SW | ... |
| PO0010 P1 | PO0010 | POLE | ... |
| PO0011 P1 | PO0011 | POLE | ... |
| LL0002 01 | LL0002 | LOADL | ... |
| PO0012 P1 | PO0012 | POLE | ... |
| PO0012 01 | PO0012 | BANK | RESISTANCE (36800Ω), REACTANCE (31300Ω), VOLTAGE RATIO 2 |
| PO0013 P1 | PO0013 | POLE | ... |
| LL0003 01 | LL0003 | LOADL | ... |
| LL0004 01 | LL0004 | LOADL | ... |
| LL0005 01 | LL0005 | LOADL | ... |
| PO0014 P1 | PO0014 | POLE | ... |
| LL0006 01 | LL0006 | LOADL | ... |
| PO0015 P1 | PO0015 | POLE | ... |
| PO0015 01 | PO0015 | BANK | RESISTANCE (36800Ω), REACTANCE (31300Ω), VOLTAGE RATIO 3 |
| PO0016 P1 | PO0016 | POLE | ... |
| LL0007 01 | LL0007 | LOADL | ... |
| LL0008 01 | LL0008 | LOADL | ... |

FIG.6

| EQUIP-MENT ID | POSITION ID₁ | POSITION ID₂ | TYPE | ATTRIBUTE INFORMATION | | |
|---|---|---|---|---|---|---|
| | | | | SPAN | RESIST-ANCE (R) | REACTANCE (X) |
| SP0001 | SS0001 | PO0001 | 3H | 21 | 220 | 150 |
| SP0002 | PO0001 | PO0002 | 3H | 29 | 220 | 150 |
| SP0003 | PO0002 | PO0003 | 3H | 32 | 220 | 150 |
| SP0004 | PO0003 | PO0004 | 3H | 32 | 220 | 150 |
| SP0005 | PO0004 | PO0005 | 3H | 29 | 220 | 150 |
| SP0006 | PO0005 | PO0006 | 3H | 25 | 220 | 150 |
| SP0007 | PO0006 | PO0007 | 3H | 31 | 220 | 150 |
| SP0008 | PO0007 | PO0008 | 3H | 24 | 220 | 150 |
| SP0009 | PO0007 | PO0008 | 3L | 24 | 390 | 240 |
| SP0010 | PO0008 | LL0001 | | 7 | 510 | 820 |
| SP0011 | PO0008 | PO0009 | 3H | 19 | 220 | 150 |
| SP0012 | PO0009 | PO0010 | 3H | 23 | 220 | 150 |
| SP0013 | PO0010 | PO0011 | 3H | 14 | 220 | 150 |
| SP0014 | PO0012 | PO0011 | 3L | 19 | 390 | 240 |
| SP0015 | PO0011 | LL0002 | | 9 | 510 | 820 |
| SP0016 | PO0011 | PO0012 | 3H | 19 | 220 | 150 |
| SP0017 | PO0012 | PO0013 | 3L | 18 | 390 | 240 |
| SP0018 | PO0013 | LL0003 | | 22 | 510 | 820 |
| SP0019 | PO0013 | LL0004 | | 21 | 510 | 820 |
| SP0020 | PO0012 | LL0005 | | 10 | 510 | 820 |
| SP0021 | PO0004 | PO0014 | 3H | 24 | 220 | 150 |
| SP0022 | PO0015 | PO0014 | 3L | 24 | 390 | 240 |
| SP0023 | PO0014 | LL0006 | | 12 | 510 | 820 |
| SP0024 | PO0014 | PO0015 | 3H | 24 | 220 | 150 |
| SP0025 | PO0015 | PO0016 | 3L | 16 | 390 | 240 |
| SP0026 | PO0016 | LL0007 | | 11 | 510 | 820 |
| SP0027 | PO0015 | LL0008 | | 11 | 510 | 820 |

FIG.7

| NODE ID | POSI-TION ID |
|---|---|
| SS0001 N01 | SS0001 |
| PO0001 N01 | PO0001 |
| PO0001 N02 | PO0001 |
| PO0002 N01 | PO0002 |
| PO0003 N01 | PO0003 |
| PO0004 N01 | PO0004 |
| PO0004 N02 | PO0004 |
| PO0005 N01 | PO0005 |
| PO0006 N01 | PO0006 |
| PO0007 N01 | PO0007 |
| PO0007 N02 | PO0007 |
| PO0008 N01 | PO0008 |
| PO0008 N02 | PO0008 |
| LL0001 N01 | LL0001 |
| PO0009 N01 | PO0009 |
| PO0009 N02 | PO0009 |
| PO0010 N01 | PO0010 |
| PO0011 N01 | PO0011 |
| PO0011 N02 | PO0011 |
| LL0002 N01 | LL0002 |
| PO0012 N01 | PO0012 |
| PO0012 N02 | PO0012 |
| PO0013 N01 | PO0013 |
| LL0003 N01 | LL0003 |
| LL0004 N01 | LL0004 |
| LL0005 N01 | LL0005 |
| PO0014 N01 | PO0014 |
| PO0014 N02 | PO0014 |
| LL0006 N01 | LL0006 |
| PO0015 N01 | PO0015 |
| PO0015 N02 | PO0015 |
| PO0016 N01 | PO0016 |
| LL0007 N01 | LL0007 |
| LL0008 N01 | LL0008 |

| BRANCH ID | NODE ID$_1$ | NODE ID$_2$ | EQUIP-MENT ID | OPEN/CLOSED DIVISION |
|---|---|---|---|---|
| BR0001 | SS0001 N01 | PO0001 N01 | SP0001 | |
| BR0002 | PO0001 N01 | PO0001 N02 | PO0001 01 | 1 |
| BR0003 | PO0001 N02 | PO0002 N01 | SP0002 | |
| BR0004 | PO0002 N01 | PO0003 N01 | SP0003 | |
| BR0005 | PO0003 N01 | PO0004 N01 | SP0004 | |
| BR0006 | PO0004 N01 | PO0004 N02 | PO0004 01 | 1 |
| BR0007 | PO0004 N02 | PO0005 N01 | SP0005 | |
| BR0008 | PO0005 N01 | PO0006 N01 | SP0006 | |
| BR0009 | PO0006 N01 | PO0007 N01 | SP0007 | |
| BR0010 | PO0007 N01 | PO0007 N02 | PO0007 01 | |
| BR0011 | PO0007 N01 | PO0008 N01 | SP0008 | |
| BR0012 | PO0007 N02 | PO0008 N02 | SP0009 | |
| BR0013 | PO0008 N02 | LL0001 N01 | SP0010 | |
| BR0014 | LL0001 N01 | | LL0001 01 | |
| BR0018 | PO0008 N01 | PO0009 N01 | SP0011 | |
| BR0019 | PO0009 N01 | PO0009 N02 | PO0009 01 | 1 |
| BR0020 | PO0009 N02 | PO0010 N01 | SP0012 | |
| BR0021 | PO0010 N01 | PO0011 N01 | SP0013 | |
| BR0022 | PO0012 N02 | PO0011 N02 | SP0014 | |
| BR0023 | PO0011 N02 | LL0002 N01 | SP0015 | |
| BR0024 | LL0002 N01 | | LL0002 01 | |
| BR0028 | PO0011 N01 | PO0012 N01 | SP0016 | |
| BR0029 | PO0012 N01 | PO0012 N02 | PO0012 01 | |
| BR0030 | PO0012 N02 | PO0013 N01 | SP0017 | |
| BR0031 | PO0013 N01 | LL0003 N01 | SP0018 | |
| BR0032 | LL0003 N01 | | LL0003 01 | |
| BR0036 | PO0013 N01 | LL0004 N01 | SP0019 | |
| BR0037 | LL0004 N01 | | LL0004 01 | |
| BR0041 | PO0012 N02 | LL0005 N01 | SP0020 | |
| BR0042 | LL0005 N01 | | LL0005 01 | |
| BR0046 | PO0004 N01 | PO0014 N01 | SP0021 | |
| BR0047 | PO0015 N02 | PO0014 N02 | SP0022 | |
| BR0048 | PO0014 N02 | LL0006 N01 | SP0023 | |
| BR0049 | LL0006 N01 | | LL0006 01 | |
| BR0053 | PO0014 N01 | PO0015 N01 | SP0024 | |
| BR0054 | PO0015 N01 | PO0015 N02 | PO0015 01 | |
| BR0055 | PO0015 N02 | PO0016 N01 | SP0025 | |
| BR0056 | PO0016 N01 | LL0007 N01 | SP0026 | |
| BR0057 | LL0007 N01 | | LL0007 01 | |
| BR0061 | PO0015 N02 | LL0008 N01 | SP0027 | |
| BR0062 | LL0008 N01 | | LL0008 01 | |

FIG.9

| CONNEC-TION ID | POSI-TION ID | AMOUNT OF POWER USAGE (ACTIVE) | AMOUNT OF POWER USAGE (REACTIVE) |
|---|---|---|---|
| SS0001 N01 | SS0001 | | |
| PO0001 N01 | PO0001 | | |
| PO0001 N02 | PO0001 | | |
| PO0002 N01 | PO0002 | | |
| PO0003 N01 | PO0003 | | |
| PO0004 N01 | PO0004 | | |
| PO0004 N02 | PO0004 | | |
| PO0005 N01 | PO0005 | | |
| PO0006 N01 | PO0006 | | |
| PO0007 N01 | PO0007 | | |
| PO0007 N02 | PO0007 | | |
| PO0008 N01 | PO0008 | | |
| PO0008 N02 | PO0008 | | |
| LL0001 N01 | LL0001 | 200 | 20 |
| PO0009 N01 | PO0009 | | |
| PO0009 N02 | PO0009 | | |
| PO0010 N01 | PO0010 | | |
| PO0011 N01 | PO0011 | | |
| PO0011 N02 | PO0011 | | |
| LL0002 N01 | LL0002 | 220 | 22 |
| PO0012 N01 | PO0012 | | |
| PO0012 N02 | PO0012 | | |
| PO0013 N01 | PO0013 | | |
| LL0003 N01 | LL0003 | 180 | 18 |
| LL0004 N01 | LL0004 | 240 | 24 |
| LL0005 N01 | LL0005 | 210 | 21 |
| PO0014 N01 | PO0014 | | |
| PO0014 N02 | PO0014 | | |
| LL0006 N01 | LL0006 | 300 | 30 |
| PO0015 N01 | PO0015 | | |
| PO0015 N02 | PO0015 | | |
| PO0016 N01 | PO0016 | | |
| LL0007 N01 | LL0007 | 240 | 24 |
| LL0008 N01 | LL0008 | 230 | 23 |

| BRANCH ID | NODE ID$_1$ | NODE ID$_2$ | EQUIPMENT ID | OPEN/ CLOSED DIVISION | REACTANCE (X) | RESIST- ANCE (R) |
|---|---|---|---|---|---|---|
| BR0001 | SS0001 N01 | PO0001 N01 | SP0001 | | 3150 | 4620 |
| BR0002 | PO0001 N01 | PO0001 N02 | PO0001 01 | 1 | 0 | 0 |
| BR0003 | PO0001 N02 | PO0002 N01 | SP0002 | | 4350 | 6380 |
| BR0004 | PO0002 N01 | PO0003 N01 | SP0003 | | 4800 | 7040 |
| BR0005 | PO0003 N01 | PO0004 N01 | SP0004 | | 4800 | 7040 |
| BR0006 | PO0004 N01 | PO0004 N02 | PO0004 01 | 1 | 0 | 0 |
| BR0007 | PO0004 N02 | PO0005 N01 | SP0005 | | 4350 | 6380 |
| BR0008 | PO0005 N01 | PO0006 N01 | SP0006 | | 3750 | 5500 |
| BR0009 | PO0006 N01 | PO0007 N01 | SP0007 | | 4650 | 6820 |
| BR0010 | PO0007 N01 | PO0007 N02 | PO0007 01 | | 31300 | 36800 |
| BR0011 | PO0007 N01 | PO0008 N01 | SP0008 | | 3600 | 5280 |
| BR0012 | PO0007 N02 | PO0008 N02 | SP0009 | | 5760 | 9360 |
| BR0013 | PO0008 N02 | LL0001 N01 | SP0010 | | 5740 | 3570 |
| BR0014 | LL0001 N01 | | LL0001 01 | | 0 | 0 |
| BR0018 | PO0008 N01 | PO0009 N01 | SP0011 | | 2850 | 4180 |
| BR0019 | PO0009 N01 | PO0009 N02 | PO0009 01 | 1 | 0 | 0 |
| BR0020 | PO0009 N02 | PO0010 N01 | SP0012 | | 3450 | 5060 |
| BR0021 | PO0010 N01 | PO0011 N01 | SP0013 | | 2100 | 3080 |
| BR0022 | PO0012 N02 | PO0011 N02 | SP0014 | | 4560 | 7410 |
| BR0023 | PO0011 N02 | LL0002 N01 | SP0015 | | 7380 | 4590 |
| BR0024 | LL0002 N01 | | LL0002 01 | | 0 | 0 |
| BR0028 | PO0011 N01 | PO0012 N01 | SP0016 | | 2850 | 4180 |
| BR0029 | PO0012 N01 | PO0012 N02 | PO0012 01 | | 31300 | 36800 |
| BR0030 | PO0012 N02 | PO0013 N01 | SP0017 | | 4320 | 7020 |
| BR0031 | PO0013 N01 | LL0003 N01 | SP0018 | | 18040 | 11220 |
| BR0032 | LL0003 N01 | | LL0003 01 | | 0 | 0 |
| BR0036 | PO0013 N01 | LL0004 N01 | SP0019 | | 17220 | 10710 |
| BR0037 | LL0004 N01 | | LL0004 01 | | 0 | 0 |
| BR0041 | PO0012 N02 | LL0005 N01 | SP0020 | | 8200 | 5100 |
| BR0042 | LL0005 N01 | | LL0005 01 | | 0 | 0 |
| BR0046 | PO0004 N01 | PO0014 N01 | SP0021 | | 3600 | 5280 |
| BR0047 | PO0015 N02 | PO0014 N02 | SP0022 | | 5760 | 9360 |
| BR0048 | PO0014 N02 | LL0006 N01 | SP0023 | | 9840 | 6120 |
| BR0049 | LL0006 N01 | | LL0006 01 | | 0 | 0 |
| BR0053 | PO0014 N01 | PO0015 N01 | SP0024 | | 3600 | 5280 |
| BR0054 | PO0015 N01 | PO0015 N02 | PO0015 01 | | 31300 | 36800 |
| BR0055 | PO0015 N02 | PO0016 N01 | SP0025 | | 3840 | 6240 |
| BR0056 | PO0016 N01 | LL0007 N01 | SP0026 | | 9020 | 5610 |
| BR0057 | LL0007 N01 | | LL0007 01 | | 0 | 0 |
| BR0061 | PO0015 N02 | LL0008 N01 | SP0027 | | 9020 | 5610 |
| BR0062 | LL0008 N01 | | LL0008 01 | | 0 | 0 |

FIG.13

| STATE ID | SAVE YEAR, MONTH, AND DAY | SAVE TIME | HISTORY YEAR, MONTH, AND DAY | HISTORY TIME | HISTORY DAY OF WEEK | HISTORY HOLIDAY CLASSIFICATION | HISTORY AMOUNT OF SOLAR RADIATION | HISTORY TEMPERATURE |
|---|---|---|---|---|---|---|---|---|
| S20120305-01 | 2012/3/5 | 11:30:00 | 2012/3/5 | 11:30 | mon | 0 | 2.25 | 17.2 |
| S20120305-02 | 2012/3/5 | 13:30:00 | 2012/3/5 | 13:30 | mon | 0 | 2.43 | 18.4 |
| S20120305-03 | 2012/3/5 | 15:30:00 | 2012/3/5 | 15:30 | mon | 0 | 2.38 | 17.8 |
| S20120305-04 | 2012/3/5 | 16:30:00 | 2012/3/5 | 16:30 | mon | 0 | 2.26 | 17.3 |
| S20120305-05 | 2012/3/5 | 18:30:00 | 2012/3/5 | 18:30 | mon | 0 | 0.52 | 15.7 |
| S20120305-06 | 2012/3/5 | 19:30:00 | 2012/3/5 | 19:30 | mon | 0 | 0 | 13.5 |
| S20120316-01 | 2012/3/16 | 13:00:00 | 2012/3/16 | 13:00 | fri | 0 | 1.87 | 14.3 |
| S20120316-02 | 2012/3/16 | 15:00:00 | 2012/3/16 | 15:00 | fri | 0 | 1.98 | 15.6 |
| S20120316-03 | 2012/3/16 | 17:00:00 | 2012/3/16 | 17:00 | fri | 0 | 1.65 | 13.9 |
| S20120320-01 | 2012/3/20 | 14:00:00 | 2012/3/20 | 14:00 | tue | 1 | 2.32 | 17.1 |
| S20120320-02 | 2012/3/20 | 16:00:00 | 2012/3/20 | 16:00 | tue | 1 | 2.22 | 16.5 |
| S20120324-01 | 2012/3/25 | 10:00:00 | 2012/3/25 | 10:00 | sun | 0 | 1.88 | 15.7 |
| S20120324-02 | 2012/3/25 | 12:00:00 | 2012/3/25 | 12:00 | sun | 0 | 1.78 | 15.9 |
| S20120331-01 | 2012/3/31 | 10:00:00 | 2012/3/31 | 10:00 | sat | 0 | 1.67 | 15.2 |
| S20120331-02 | 2012/3/31 | 12:00:00 | 2012/3/31 | 12:00 | sat | 0 | 2.01 | 16.3 |

| STATE ID | NODE ID | POSI-TION ID | AMOUNT OF POWER USAGE (ACTIVE) | AMOUNT OF POWER USAGE (REACTIVE) |
|---|---|---|---|---|
| S20120305-01 | SS0001 N01 | SS0001 | | |
| S20120305-01 | PO0001 N01 | PO0001 | | |
| S20120305-01 | PO0001 N02 | PO0001 | | |
| S20120305-01 | PO0002 N01 | PO0002 | | |
| S20120305-01 | PO0003 N01 | PO0003 | | |
| S20120305-01 | PO0004 N01 | PO0004 | | |
| S20120305-01 | PO0004 N02 | PO0004 | | |
| S20120305-01 | PO0005 N01 | PO0005 | | |
| S20120305-01 | PO0006 N01 | PO0006 | | |
| S20120305-01 | PO0007 N01 | PO0007 | | |
| S20120305-01 | PO0007 N02 | PO0007 | | |
| S20120305-01 | PO0008 N01 | PO0008 | | |
| S20120305-01 | PO0008 N02 | PO0008 | | |
| S20120305-01 | LL0001 N01 | LL0001 | 200 | 20 |
| S20120305-01 | PO0009 N01 | PO0009 | | |
| S20120305-01 | PO0009 N02 | PO0009 | | |
| S20120305-01 | PO0010 N01 | PO0010 | | |
| S20120305-01 | PO0011 N01 | PO0011 | | |
| S20120305-01 | PO0011 N02 | PO0011 | | |
| S20120305-01 | LL0002 N01 | LL0002 | 220 | 22 |
| S20120305-01 | PO0012 N01 | PO0012 | | |
| S20120305-01 | PO0012 N02 | PO0012 | | |
| S20120305-01 | PO0013 N01 | PO0013 | | |
| S20120305-01 | LL0003 N01 | LL0003 | 180 | 18 |
| S20120305-01 | LL0004 N01 | LL0004 | 240 | 24 |
| S20120305-01 | LL0005 N01 | LL0005 | 210 | 21 |
| S20120305-01 | PO0014 N01 | PO0014 | | |
| S20120305-01 | PO0014 N02 | PO0014 | | |
| S20120305-01 | LL0006 N01 | LL0006 | 300 | 30 |
| S20120305-01 | PO0015 N01 | PO0015 | | |
| S20120305-01 | PO0015 N02 | PO0015 | | |
| S20120305-01 | PO0016 N01 | PO0016 | | |
| S20120305-01 | LL0007 N01 | LL0007 | 240 | 24 |
| S20120305-01 | LL0008 N01 | LL0008 | 230 | 23 |

FIG.15

| STATE ID | BRANCH ID | NODE ID₁ | NODE ID₂ | EQUIPMENT ID | OPEN/ CLOSED DIVISION | REACTANCE (X) | RESIST- ANCE (R) |
|---|---|---|---|---|---|---|---|
| S20120305-01 | BR0001 | SS0001 N01 | PO0001 N01 | SP0001 | | 3150 | 4620 |
| S20120305-01 | BR0002 | PO0001 N01 | PO0001 N02 | PO0001 01 | 1 | 0 | 0 |
| S20120305-01 | BR0003 | PO0001 N02 | PO0002 N01 | SP0002 | | 4350 | 6380 |
| S20120305-01 | BR0004 | PO0002 N01 | PO0003 N01 | SP0003 | | 4800 | 7040 |
| S20120305-01 | BR0005 | PO0003 N01 | PO0004 N01 | SP0004 | | 4800 | 7040 |
| S20120305-01 | BR0006 | PO0004 N01 | PO0004 N02 | PO0004 01 | 1 | 0 | 0 |
| S20120305-01 | BR0007 | PO0004 N02 | PO0005 N01 | SP0005 | | 4350 | 6380 |
| S20120305-01 | BR0008 | PO0005 N01 | PO0006 N01 | SP0006 | | 3750 | 5500 |
| S20120305-01 | BR0009 | PO0006 N01 | PO0007 N01 | SP0007 | | 4650 | 6820 |
| S20120305-01 | BR0010 | PO0007 N01 | PO0007 N02 | PO0007 01 | | 31300 | 36800 |
| S20120305-01 | BR0011 | PO0007 N01 | PO0008 N01 | SP0008 | | 3600 | 5280 |
| S20120305-01 | BR0012 | PO0007 N02 | PO0008 N02 | SP0009 | | 5760 | 9360 |
| S20120305-01 | BR0013 | PO0008 N02 | LL0001 N01 | SP0010 | | 5740 | 3570 |
| S20120305-01 | BR0014 | LL0001 N01 | | LL0001 01 | | 0 | 0 |
| S20120305-01 | BR0018 | PO0008 N01 | PO0009 N01 | SP0011 | | 2850 | 4180 |
| S20120305-01 | BR0019 | PO0009 N01 | PO0009 N02 | PO0009 01 | 1 | 0 | 0 |
| S20120305-01 | BR0020 | PO0009 N02 | PO0010 N01 | SP0012 | | 3450 | 5060 |
| S20120305-01 | BR0021 | PO0010 N01 | PO0011 N01 | SP0013 | | 2100 | 3080 |
| S20120305-01 | BR0022 | PO0012 N02 | PO0011 N02 | SP0014 | | 4560 | 7410 |
| S20120305-01 | BR0023 | PO0011 N02 | LL0002 N01 | SP0015 | | 7380 | 4590 |
| S20120305-01 | BR0024 | LL0002 N01 | | LL0002 01 | | 0 | 0 |
| S20120305-01 | BR0028 | PO0011 N01 | PO0012 N01 | SP0016 | | 2850 | 4180 |
| S20120305-01 | BR0029 | PO0012 N01 | PO0012 N02 | PO0012 01 | | 31300 | 36800 |
| S20120305-01 | BR0030 | PO0012 N02 | PO0013 N01 | SP0017 | | 4320 | 7020 |
| S20120305-01 | BR0031 | PO0013 N01 | LL0003 N01 | SP0018 | | 18040 | 11220 |
| S20120305-01 | BR0032 | LL0003 N01 | | LL0003 01 | | 0 | 0 |
| S20120305-01 | BR0036 | PO0013 N01 | LL0004 N01 | SP0019 | | 17220 | 10710 |
| S20120305-01 | BR0037 | LL0004 N01 | | LL0004 01 | | 0 | 0 |
| S20120305-01 | BR0041 | PO0012 N02 | LL0005 N01 | SP0020 | | 8200 | 5100 |
| S20120305-01 | BR0042 | LL0005 N01 | | LL0005 01 | | 0 | 0 |
| S20120305-01 | BR0046 | PO0004 N01 | PO0014 N01 | SP0021 | | 3600 | 5280 |
| S20120305-01 | BR0047 | PO0015 N02 | PO0014 N02 | SP0022 | | 5760 | 9360 |
| S20120305-01 | BR0048 | PO0014 N02 | LL0006 N01 | SP0023 | | 9840 | 6120 |
| S20120305-01 | BR0049 | LL0006 N01 | | LL0006 01 | | 0 | 0 |
| S20120305-01 | BR0053 | PO0014 N01 | PO0015 N01 | SP0024 | | 3600 | 5280 |
| S20120305-01 | BR0054 | PO0015 N01 | PO0015 N02 | PO0015 01 | | 31300 | 36800 |
| S20120305-01 | BR0055 | PO0015 N02 | PO0016 N01 | SP0025 | | 3840 | 6240 |
| S20120305-01 | BR0056 | PO0016 N01 | LL0007 N01 | SP0026 | | 9020 | 5610 |
| S20120305-01 | BR0057 | LL0007 N01 | | LL0007 01 | | 0 | 0 |
| S20120305-01 | BR0061 | PO0015 N02 | LL0008 N01 | SP0027 | | 9020 | 5610 |
| S20120305-01 | BR0062 | LL0008 N01 | | LL0008 01 | | 0 | 0 |

FIG.16

| YEAR, MONTH, AND DAY | TIME | DAY OF WEEK | HOLIDAY CLASSIFI- CATION | AMOUNT OF SOLAR RADIATION | TEMPER- ATURE |
|---|---|---|---|---|---|
| 2012/4/30 | 13:00 | mon | 1 | 2.12 | 15.2 |

FIG.17

| STATE ID | SAVE YEAR, MONTH, AND DAY | SAVE TIME | HISTORY YEAR, MONTH, AND DAY | HISTORY TIME | HISTORY DAY OF WEEK | HISTORY HOLIDAY CLASSIFICATION | HISTORY AMOUNT OF SOLAR RADIATION | HISTORY TEMPER- ATURE |
|---|---|---|---|---|---|---|---|---|
| S20120324-01 | 2012/3/25 | 10:00:00 | 2012/3/25 | 10:00:00 | sun | 0 | 1.88 | 15.7 |
| S20120324-02 | 2012/3/25 | 12:00:00 | 2012/3/25 | 12:00:00 | sun | 0 | 1.78 | 15.9 |
| S20120320-02 | 2012/3/20 | 16:00:00 | 2012/3/20 | 16:00:00 | tue | 1 | 2.22 | 16.5 |

# POWER DISTRIBUTION MANAGEMENT APPARATUS, PATTERN EXTRACTION METHOD, AND RECORDING MEDIUM

CROSS-REFERENCE TO RELATED APPLICATION

This application is a continuation application of International Application PCT/JP2012/075437, filed on Oct. 1, 2012, and designating the U.S., the entire contents of which are incorporated herein by reference.

FIELD

The present invention relates to a power distribution management apparatus, a pattern extraction method, and a pattern extraction program.

BACKGROUND

A power distribution system includes a high voltage line used for power distribution of high voltage power, and a low voltage line used for power distribution of low voltage power. A standard voltage and a tolerance range within which a deviation from the standard voltage is allowed are established for these high voltage line and low voltage line. Hence, voltage drop is calculated dividing the power distribution system from a substation to load equipment into a high voltage system including equipment such as the high voltage line and a switch, and a low voltage system including equipment such as the low voltage line and a service drop. After that, the voltage of electric power distributed from the substation is set, or the voltage of power flowing through the power distribution system is adjusted by switching a switch placed in the high voltage system, in such a manner as that the voltages before and after the voltage drop fall within the tolerance range in the high voltage system and the low voltage system.

Patent Document 1: Japanese Laid-open Patent Publication No. 2012-44740
Patent Document 2: Japanese Laid-open Patent Publication No. 2012-29412

However, a reverse flow due to a distributed energy resource or the like is not expected in the above technology. Therefore, the power beyond the tolerance range of voltage may fail to be prevented from flowing in the power distribution system.

In other words, the distributed energy resource is installed at a customer's premises in some cases with the spread of the distributed energy resources such as solar power generation. In this case, a reverse flow may occur from the distributed energy resource installed at the customer's premises to the power distribution system of an electric utility. In this manner, if power flows in two ways between the substation and the load equipment, the change of power at each piece of equipment included in the low voltage system may be increased by the reverse flow. For example, even if the voltage is within the tolerance range during the occurrence of the reverse flow, when the reverse flow stops occurring, power is distributed to the load equipment, which uses the power. Accordingly, the voltage may exceed the tolerance range and be reduced in the power distribution system.

SUMMARY

According to an aspect of the embodiments, a power distribution management apparatus includes a memory configured to store history information including a pattern of open and closed states of switches that switch a path that supplies power between a substation and load equipment of a customer, and attribute information related to an environment where the power is supplied; a processor configured to execute a process including: upon acceptance of specification of the attribute information related to the environment, calculating a degree of similarity between the specified attribute information and attribute information included in the history information; and extracting a pattern of the open and closed states of switches whose degree of similarity satisfies a predetermined condition among the history information.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 4 is a diagram illustrating an example of a "location" table.
FIG. 5 is a diagram illustrating an example of a "unit" table.
FIG. 6 is a diagram illustrating an example of a "span" table.
FIG. 7 is a diagram illustrating an example of a node table.
FIG. 8 is a diagram illustrating an example of a "branch" table.
FIG. 9 is a diagram illustrating an example of a current node table.
FIG. 10 is a diagram illustrating an example of a current "branch" table.
FIG. 13 is a diagram illustrating an example of a history ID table.
FIG. 14 is a diagram illustrating an example of a history node table.
FIG. 15 is a diagram illustrating an example of a history "branch" table.
FIG. 16 is a diagram illustrating an example of specified attribute information.
FIG. 17 is a diagram illustrating an example of an extraction result of state IDs from a similar pattern list.

DESCRIPTION OF EMBODIMENTS

A power distribution management apparatus, a pattern extraction method, and a pattern extraction program according to the present application are hereinafter described with reference to the accompanying drawings. Embodiments thereof do not limit the technology of the present disclosure. The embodiments can be combined within the scope that does not contradict processing contents, as appropriate.

First Embodiment

[Configuration of Power Distribution Management Apparatus]

Figure 1:
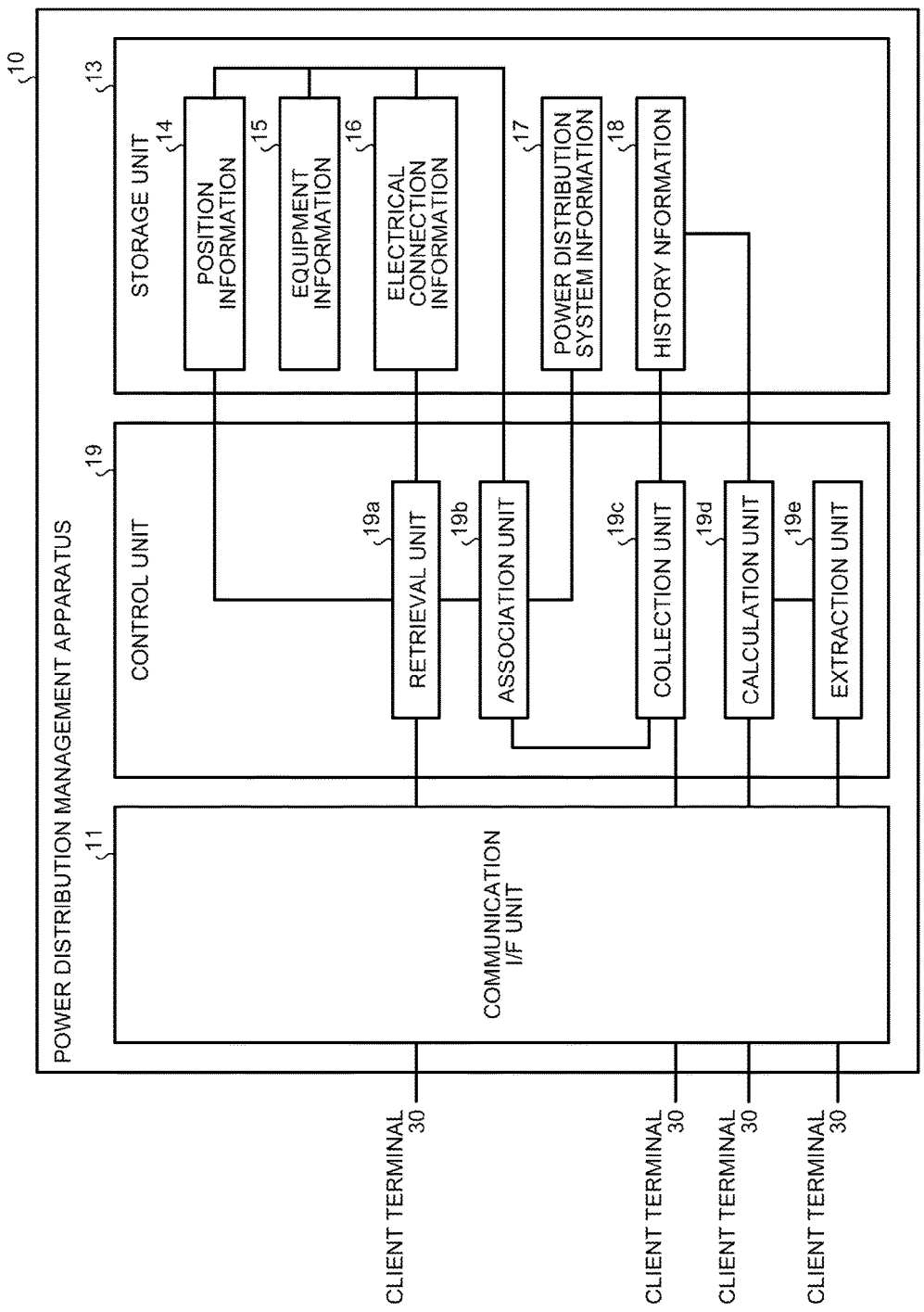
FIG. 1 is a block diagram illustrating the functional configuration of a power distribution management apparatus according to a first embodiment.

FIG. 1 is a block diagram illustrating the functional configuration of a power distribution management apparatus according to a first embodiment. A power distribution management apparatus 10 illustrated in FIG. 1 executes a pattern extraction process that extracts a combination pattern of the open and closed states of switches that switch a path through which power is supplied between a substation and load equipment of a customer in accordance with specified attribute information related to a power supply environment.

An aspect of such a power distribution management apparatus 10 may be implemented as a Web server that executes the above pattern extraction process, and can also be implemented as a cloud that provides service related to the above pattern extraction process by outsourcing. As another aspect, it can also be implemented by preinstalling or installing a pattern extraction program provided as packaged software or online software in a desired computer.

As illustrated in FIG. 1, the power distribution management apparatus 10 is connected in such a manner as to be able to communicate with another apparatus such as a client terminal 30 via a predetermined network. Any kind of communication network, such as the Internet (Internet), a LAN (Local Area Network), or VPN (Virtual Private Network), can be adopted as such a network, irrespective of wired or wireless. Any given number of client terminals 30 can be connected.

Of them, the client terminal 30 is a terminal apparatus on a side that receives the provision of the above pattern extraction service. As an example of such a client terminal 30, mobile terminals such as mobile phones, PHSs (Personal Handyphone System) and PDAs (Personal Digital Assistant), in addition to fixed terminals including personal computers (PC: personal computer), can also be adopted. The client terminal 30 is used by staff from an electric utility, for example, a person in charge and manager of a power distribution department.

As illustrated in FIG. 1, the power distribution management apparatus 10 includes a communication I/F (interface) unit 11, a storage unit 13, and a control unit 19. The power distribution management apparatus 10 may include various functional units included in a known computer, for example, functional units such as various input/output devices and imaging devices, other than the functional units illustrated in FIG. 1.

The communication I/F unit 11 is an interface that controls communication with another apparatus, for example, the client terminal 30. As an aspect of such a communication I/F unit 11, a network interface card such as a LAN card can be adopted. For example, the communication I/F unit 11 receives, from the client terminal 30, various pieces of information such as a request to extract a combination pattern, or notifies a combination pattern of the open and closed states of switches from the power distribution management apparatus 10 to the client terminal 30.

The storage unit 13 is a storage device that stores an OS (Operating System) and various programs such as the pattern extraction program, which are executed by the control unit 19. Aspects of the storage unit 13 include storage devices such as semiconductor memory devices, for example, flash memories, hard disks, and optical discs. The storage unit 13 is not limited to the above types of storage devices, and may be RAM (Random Access Memory), or ROM (Read Only Memory).

The storage unit 13 stores position information 14, equipment information 15, electrical connection information 16, power distribution system information 17, and history information 18 as examples of data used for a program to be executed by the control unit 19. In addition to the above illustrated information, other electronic data, for example, map information covering power distribution systems controlled by the electric utility, can also be stored together.

Here, the power distribution management apparatus 10 according to the embodiment manages the power distribution system by dividing the management into three: position management to manage a position where equipment is installed, equipment management to manage each piece of equipment, electrical connection management to manage electrically interconnected pieces of equipment.

Of them, the position management uses, as entities, positions "locations (location)" where predetermined pieces of equipment such as substations, power poles, and transformers, among equipment forming the power distribution system, are installed. Moreover, the equipment management uses, as entities, equipment "unit" tied to one position and equipment "span" tied to two positions among the equipment forming the power distribution system. Moreover, the electrical connection management uses, as entities, a connection point "node" electrically interconnecting pieces of equipment, and equipment "branch" defined by a plurality of connection points.

Figure 2:
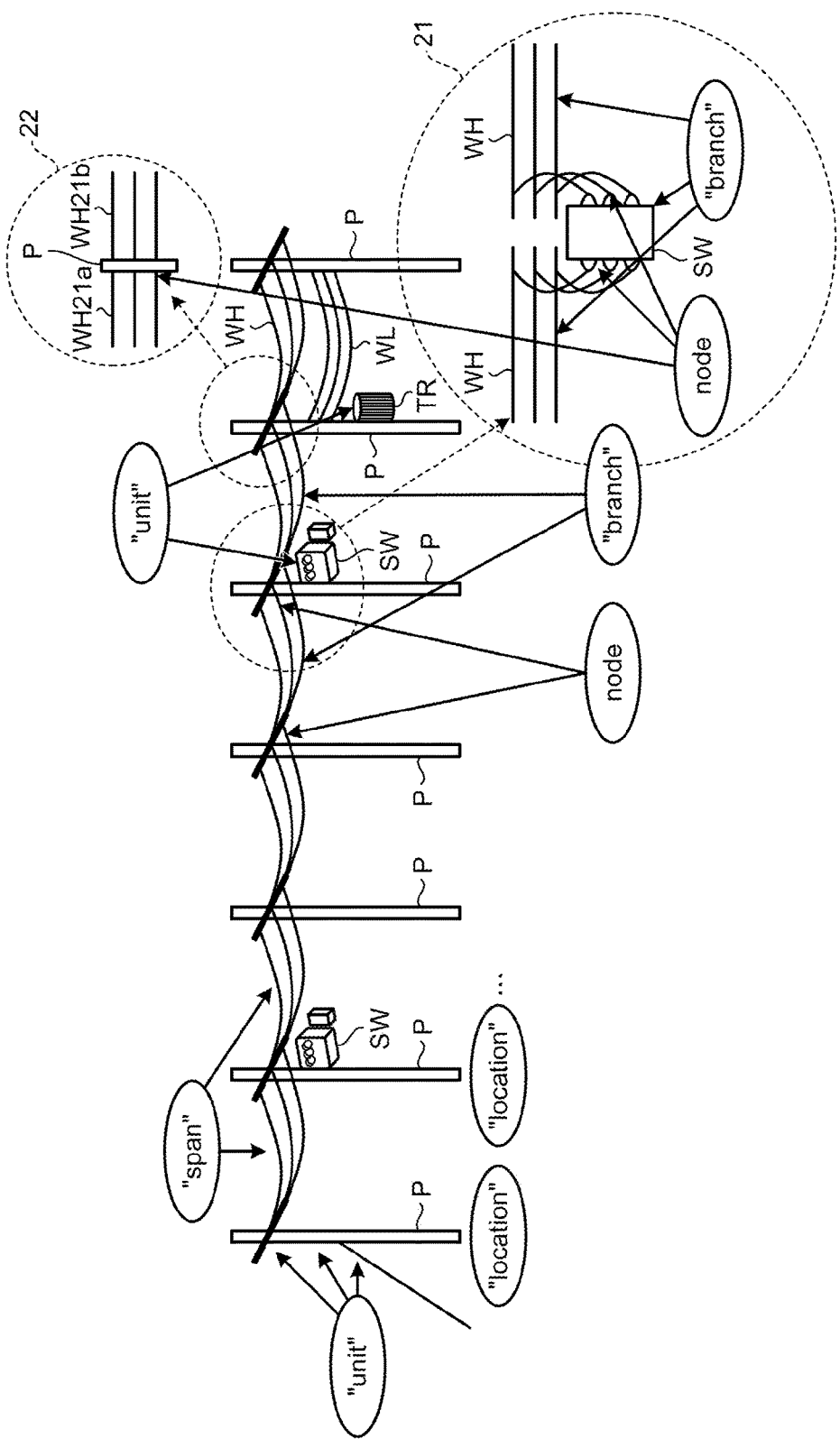
FIG. 2 is a diagram illustrating an aspect of entities.

FIG. 2 is a diagram illustrating an aspect of entities. As illustrated in FIG. 2, examples of the "location" include a position where non-overhead strung equipment in an installation form of not being strung overhead, such as a power pole P or a pole transformer TR, is installed. In addition, the category of "locations" also includes a position where an unillustrated distribution substation (SS: SubStation) is installed, and a position where a transformer is installed. Here, the equipment installed on the ground was illustrated. However, the category of "locations" also includes positions where equipment installed underground, for example, a manhole and a hand hole, is installed.

Examples of the "unit" include the power pole P, a switch SW, and the pole transformer TR. In addition, the category of "units" also includes the unillustrated distribution substation, a SVR (Step Voltage Regulator), various meters, for example, a smart meter, and a manhole and a hand hole that are underground equipment.

An example of the "span" is a power line WH installed in the high voltage system that carries high voltage power between the distribution substation and the pole transformer TR, what is called a "high voltage line". Other examples of the "span" are a power line WL installed in a section between the pole transformer TR and a service drop of the low voltage system that carries low voltage power between the pole transformer TR and the customer's load equipment, what is called a "low voltage line," and also a power line installed in a section between the service drop and the load equipment, what is called a "service drop." Still another example of the "span" is a cable buried underground. In terms of a power line W such as the high voltage line WH or the low voltage line WL, wires in the unit of installation on the pole P, the number of which is, for example, three or two, can be collectively treated as one "span".

Examples of the node include a connection point of the high voltage line WH and the switch SW illustrated in an enlarged view 21 in FIG. 2, and a connection point of the high voltage line WH and the pole transformer TR, and a connection point of the pole transformer TR and the low voltage line WL. In addition, the category of nodes also includes a point that connects a high voltage line WH21a and a high voltage line WH21b illustrated in an enlarged view 22 of FIG. 2. Specifically, also if the high voltage line WH21a and the high voltage line WH21b are installed on the pole P being a street assembled pole, the high voltage line WH21a and the high voltage line WH21b are assumed to be electrically connected. A point connecting the high voltage lines WH is treated as a virtual node.

Examples of the "branch" include various pieces of equipment such as the pole P, the high voltage line WH, the switch SW, the pole transformer TR, and the low voltage line WL, which are illustrated in FIG. 2. In addition, the category of "branches" also includes the unillustrated distribution substation, service drop, smart meter, and load equipment. Equipment located at an endpoint such as the distribution substation or load equipment may have only one node.

Figure 3:
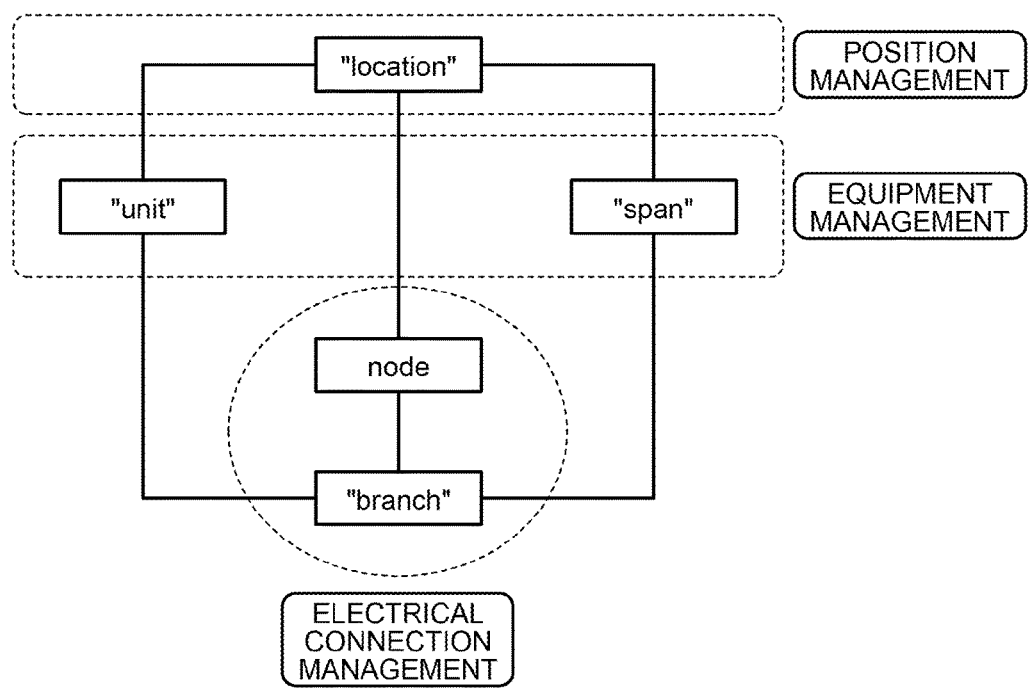
FIG. 3 is a diagram illustrating an example of an interrelation of the entities.

The entities of the "location", the "unit", the "span", the node, and the "branch" have relevance as illustrated in FIG. 3. FIG. 3 is a diagram illustrating an example of a mutual relation of the entities. As illustrated in FIG. 3, the "location" is used for managing position information of the "unit" and the "span". In addition, the "branch" is used for managing facility information of the "unit" and the "span". Furthermore, the "location" and the "branch" are related by the node.

Return to the description of FIG. 1. The position information 14 contains a "location" table 14a that manages the above "locations". Moreover, the equipment information 15 contains a "unit" table 15a that manages the above "units" and a "span" table 15b that manages the above "spans". Furthermore, the electrical connection information 16 contains a node table 16a that manages the above nodes, and a "branch" table 16b that manages the above "branches". Moreover, as described below, the power distribution system information 17 contains a current node table 17a and a current "branch" table 17b. Moreover, as described below, the history information 18 contains a history node table 18a, a history "branch" table 18b, and a history ID table 18c.

As an aspect of the "location" table 14a among the tables, a table where items such as a position ID (identifier), position type, longitude, and latitude are associated can be adopted. Such a "position ID" indicates identification information that identifies a position where equipment is installed. Moreover, the "position type" indicates the identification of the type of position, and includes, for example, types such as distribution substation (SS), pole (POLE), and load equipment (LOADL). In terms of information to be stored in the "location" table 14a, the position information of a specific piece of equipment such as a substation, pole, or transformer can be acquired from, for example, another existing system, for example, a power distribution management system that manages power distribution system equipment.

FIG. 4 is a diagram illustrating an example of the "location" table 14a. For example, a "location" with a position ID "SS0001" illustrated in FIG. 4 indicates that there is a distribution substation located at 50 degrees 27 minutes 23 seconds 016 north latitude and 128 degrees 08 minutes 48 seconds 66 east longitude. Moreover, various IDs illustrated in FIG. 4 and later are numbered by adding a character string that can identify the type of equipment such as "SS" representing a distribution substation, "PO" representing a pole, or load equipment "LL" to the start of a character string forming an ID. In terms of the various IDs, it is not limited to numbering by adding a character string that can identify the type of equipment to the start of a character string forming an ID, but a uniquely identifiable value may be added. Here, the case of using longitude and latitude as the items identifying the position of the equipment has been illustrated. However, other items such as a local coordinate value and address can also be used.

A table where items such as an equipment ID, a position ID, a type, and attribute information are associated can be adopted as an aspect of the "unit" table 15a. Such an "equipment ID" indicates identification information that identifies equipment. Only the equipment ID of a "unit" is stored in the "unit" table 15a. Moreover, the "type" indicates the type of "unit". Examples of the type include such as pole (POLE), switch (SW), pole transformer (BANK), and load equipment (LOADL). Moreover, the "attribute information" indicates information on the attribute of a "unit". For example, the model number and performance of the "unit", and the capacity and voltage ratio of a transformer in a case, for example, where the "unit" is a transformer are registered. The capacity of such a transformer can be used for the calculation of voltage drop when electrical connection information of the current system equipment is extracted. For example, if the "unit" is a transformer, a resistance value, a reactance value, and a voltage ratio of the transformer are registered. Information to be stored in the "unit" table 15a is acquired from, for example, another existing system, for example, a power distribution equipment management system. The attribute information of equipment classified as the "unit" among the acquired attribute information of the equipment is registered.

FIG. 5 is a diagram illustrating an example of the "unit" table 15a. For example, a "unit" with an equipment ID "PO0001P1" illustrated in FIG. 5 indicates a pole located at a position corresponding to a position ID "PO0001", in other words, at 50 degrees 27 minutes 23 seconds 021 north latitude and 128 degrees 08 minutes 41 seconds 76 east longitude illustrated in FIG. 4. Moreover, a "unit" with an equipment ID "PO000101" illustrated in FIG. 5 indicates a switch located at a position corresponding to the position ID "PO0001", in other words, at 50 degrees 27 minutes 23 seconds 021 north latitude and 128 degrees 08 minutes 41 seconds 76 east longitude illustrated in FIG. 4. Moreover, a "unit" with an equipment ID "PO000701" illustrated in FIG. 5 indicates a pole transformer with a resistance value of "36800Ω", a reactance value of "31300Ω", and a voltage ratio of one, the pole transformer being located at a position corresponding to a position ID "PO0007", in other words, at 50 degrees 27 minutes 27 seconds 844 north latitude and 128 degrees 08 minutes 34 seconds 30 east longitude in the case of the example of FIG. 4.

A table where items such as an equipment ID, a position $ID_1$, a position $ID_2$, a type, and attribute information are associated can be adopted as an aspect of the "span" table 15b. The "position ID" referred to here also indicates the identification information that identifies equipment. However, only the equipment ID of the "span" is stored in the "span" table 15b. Moreover, the "position ID$_1$" indicates one of two position IDs tied to the "span". The "location ID$_2$" indicates the other position ID of the two position IDs tied to the "span". Moreover, the "type" indicates the type of "span". Examples of the type include a high voltage line, a low voltage line, and a service drop. Moreover, the "attribute information" indicates information on the attribute of the "span". For example, the model number, size, material, span, resistance value per unit (m), and reactance value per unit (m) of the "span" are registered. Such a span, resistance value per unit, and reactance value per unit can be used for the calculation of voltage drop when electrical connection information of the current system equipment is extracted. Information to be stored in the "span" table 15b is acquired from, for example, another existing system, for example, the power distribution equipment management system. The attribute information of equipment classified as the "span" among the acquired attribute information of the equipment is registered.

FIG. 6 is a diagram illustrating an example of the "span" table 15b. For example, a "span" with an equipment ID "SP0001" illustrated in FIG. 6 indicates a three-phase high voltage line installed in a section between a position corresponding to the position ID$_1$ "SS0001" and a position corresponding to the position ID$_2$ "PO0001". As described using FIG. 4, such a section corresponds to a section from 50 degrees 27 minutes 23 seconds 016 north latitude and 128 degrees 08 minutes 48 seconds 66 east longitude to 50 degrees 27 minutes 23 seconds 021 north latitude and 128 degrees 08 minutes 41 seconds 76 east longitude. Furthermore, the span, resistance, and reactance of the "span" with the equipment ID "SP0001" indicate "21 m," "220 Ω/m," "150 Ω/m," respectively. If the type illustrated in FIG. 6 is 3H, it indicates that the "span" is a single-phase three-wire high voltage line. If the type is 3L, it indicates the "span" is a single-phase three-wire low voltage line. Moreover, if the type is blank, it indicates the "span" is a service drop.

A table where items such as a node ID and a position ID are associated can be adopted as an aspect of the node table 16a. Such a "node ID" indicates identification information that identifies a node. Information to be stored in the node table 16a is acquired from other existing systems, for example, the power distribution equipment management system, and an automatic power distribution system that monitors the power distribution system and operates a switch remotely. For example, a node is extracted from information on lower voltage system equipment acquired from the power distribution equipment management system or information on high voltage system equipment acquired from the automatic power distribution system, then associated with the location of the node, and registered in the node table 16a.

FIG. 7 is a diagram illustrating an example of the node table 16a. For example, a connection point with a node ID "SS0001N01" illustrated in FIG. 7 indicates to be located at a position corresponding to the position ID "SS0001", in other words, at 50 degrees 27 minutes 23 seconds 016 north latitude and 128 degrees 08 minutes 48 seconds 66 east longitude illustrated in FIG. 4. Moreover, both of connection points with node IDs "PO0001N01" and "PO0001N02" illustrated in FIG. 7 indicate to be located at the same position corresponding to the position ID "PO0001", in other words, at 50 degrees 27 minutes 23 seconds 021 north latitude and 128 degrees 08 minutes 41 seconds 76 east longitude illustrated in FIG. 4.

A table where items such as a branch ID, a node ID$_1$, a node ID$_2$, an equipment ID, and an open/closed division are associated can be adopted as an aspect of the "branch" table 16b. Such a "branch ID" indicates identification information that identifies a "branch". Moreover, the "node ID$_1$" indicates one node ID of two node IDs of a "branch". The "node ID$_2$" indicates the other node ID of the two node IDs of the "branch". However, a "branch" located at an endpoint such as the distribution substation or load equipment may have only one of the node ID$_1$ and the node ID$_2$. For example, a node ID of a connection point closer to the primary side than the node ID$_2$, in other words, closer to the substation, is registered in the node ID$_1$ out of the node ID$_1$ and the node ID$_2$. A node ID of a connection point closer to the secondary side than the node ID$_1$, in other words, closer to the load equipment, is registered in the node ID$_2$. Moreover, the "equipment ID" referred to here also indicates the identification information that identifies equipment. However, an equipment ID of either the "unit" or "span" is stored in the "branch" table 16b. Moreover, the "open/closed division" indicates the switch open/closed state of the switch. Information indicating either the "open state" or "closed state" is set in such an open/closed division if the "branch" is a switch, but is set to be "blank" if the "branch" is anything other than a switch.

Information to be stored in the "branch" table 16b is acquired from other existing systems, for example, the power distribution equipment management system and the automatic power distribution system. For example, a "branch" is extracted from information on low voltage system equipment acquired from the power distribution equipment management system, or information on high voltage system equipment acquired from the automatic power distribution system, then associated with a node(s) of the "branch", and registered in the "branch" table 16b.

FIG. 8 is a diagram illustrating an example of the "branch" table 16b. For example, a "branch" with a branch ID "BR0001" illustrated in FIG. 8 indicates a high voltage line with the equipment ID "SP0001" defined by the node ID$_1$ "SS0001N01" and the node ID$_2$ "PO0001N01". Moreover, a "branch" with a branch ID "BR0002" illustrated in FIG. 8 indicates a switch with the equipment ID "PO000101" defined by the node ID$_1$ "PO0001N01" and the node ID$_2$ "PO0001N02", and indicates that the switch is in the closed state since its open/closed division is "1". If the open/closed division illustrated in FIG. 8 is "0", it indicates that the switch is in the open state. Moreover, if the open/closed division is blank, it indicates that the equipment is not a switch. The closed state of the switch is a state of flowing electricity. The open state is a state of not flowing electricity.

Among the information to be stored in the storage unit 13, the power distribution system information 17 and the history information 18, apart from the above position information 14, equipment information 15, and electrical connection information 16, is described below in step with descriptions of functional units that generate, acquire, or use these pieces of information.

The control unit 19 includes an internal memory for storing a program stipulating various processing procedures and control data, and executes various processes based on the program and control data. As illustrated in FIG. 1, the control unit 19 includes a retrieval unit 19a, an association unit 19b, a collection unit 19c, a calculation unit 19d, and an extraction unit 19e.

The retrieval unit 19a is a processing unit that refers to the electrical connection information 16, sets a predetermined node as a starting point, and retrieves a "branch" corresponding to a combination of nodes while searching for an unsearched node of nodes included in the combination of nodes.

As an aspect, the retrieval unit 19a starts a process if accepting a request to view the power distribution system information via the client terminal 30, or if a fixed period has passed since the previous execution of the process. Firstly, the retrieval unit 19a retrieves position IDs with a position type of the distribution substation "SS" among the position IDs stored in the "location" table 14a. The retrieval unit 19a then registers the position IDs of SS retrieved from the "location" table 14a in a search list stored in the unillustrated internal memory. In addition to the position IDs of SS targeted for the search, unsearched nodes and "branches" found during the search are registered in such a search list at any time. Here, the case of retrieving the position IDs of SS from the "location" table 14a was illustrated. However, it may be configured such that a node ID whose character string begins with "SS" among the node IDs stored in the node table 16a and the "branch" table 16b is retrieved.

Next, the retrieval unit 19a selects one position ID of SS registered in the search list. The retrieval unit 19a then retrieves a node corresponding to the position ID of SS for which the selection was made first among the nodes stored in the node table 16a. After that, the retrieval unit 19a registers a record of the node retrieved from the node table 16a in the current node table 17a stored as the power distribution system information 17 in the storage unit 13. Furthermore, the retrieval unit 19a registers the node retrieved from the node table 16a in the search list. If SS has a plurality of SS banks, records of a plurality of nodes are retrieved even if retrieval is performed using one position ID.

The retrieval unit 19a then selects one node registered in the search list. Next, the retrieval unit 19a retrieves a record of a "branch" having a combination of node IDs including the node for which the selection was made first, in other words, a combination of the node $ID_1$ and the node $ID_2$ from among the "branches" stored in the "branch" table 16b. After that, the retrieval unit 19a registers the record of the "branch" retrieved from the "branch" table 16b in the current "branch" table 17b stored as the power distribution system information 17 in the storage unit 13. Furthermore, the retrieval unit 19a registers, in the search list, the "branch" retrieved from the "branch" table 16b. At this point in time, it is sufficient if one registered in the search list is information that can identify a "branch". For example, it is sufficient if at least either the branch ID or equipment ID is registered.

Next, the retrieval unit 19a selects one "branch" registered in the search list. The retrieval unit 19a then retrieves, from the "span" table 15b, attribute information corresponding to an equipment ID of the "branch" for which the selection was made first. At this point in time, if the "branch" is a "span", the attribute information can be retrieved from the "span" table 15b. However, if the "branch" is a unit, the retrieval of the attribute information fails. Hence, the retrieval unit 19a retrieves, from the unit table 15a, the attribute information corresponding to the equipment ID of the "branch" for which the selection was made first, if the retrieval of the attribute information from the "span" table 15b failed.

If the other node paired with the node used for the search among the combination of nodes is not blank, then the retrieval unit 19a judges whether or not the "branch" is a switch. If the "branch" is a switch, then the retrieval unit 19a judges whether or not the switch is in the switch closed state, in other words, whether or not the open/closed division is "1". At this point in time, if the switch is in the switch closed state, the retrieval unit 19a retrieves a record of the other node from the node table 16a and then registers the record in the current node table 17a of the power distribution system information 17. Furthermore, the retrieval unit 19a adds the other node as an unsearched node to the search list.

The retrieval unit 19a then repeatedly executes the processing from the selection of an unsearched "branch" up to this point until searching for all the "branches" registered in the search list. If having searched for all the "branches" registered in the search list, then the retrieval unit 19a repeatedly executes the processing from the selection of an unsearched node up to this point until searching for all the nodes registered in the search list. The retrieval unit 19a then repeatedly executes the processing from the selection of an unsearched position ID of SS up to this point until searching for all the position IDs of SS registered in the search list.

The association unit 19b is a processing unit that associates equipment obtained as a result of a combination of connection points for which a search was made, and retrieval with attribute information corresponding to the equipment obtained as a result of the retrieval among pieces of attribution information included in the equipment information 15. As an aspect, the association unit 19b associates a record of a "branch" for which a search was made with attribute information of the "branch" retrieved from the "span" table 15b or the "unit" table 15a. For example, the association unit 19b associates attribute information of the "branch" used for the retrieval from the "span" table 15b or the "unit" table 15a with an equipment ID or branch ID of the "branch" among the records stored in the current "branch" table 17b and registers the attribute information of the "branch". At this point in time, the association unit 19b can also retrieve a position ID corresponding to the equipment ID of the "branch" from the "unit" table 15a or the "span" table 15b and further associate the position ID.

Here, the contents of processes by the retrieval unit 19a and the association unit 19b are specifically described using the tables of FIGS. 4 to 8. Firstly, among the position IDs stored in the "location" table 14a illustrated in FIG. 4, the position ID "SS0001" whose position type is the distribution substation "SS" is retrieved. Then, the position ID "SS0001" of SS retrieved from the "location" table 14a is registered in the search list. In this case, only "SS0001" is registered as the position ID of SS in the search list. Accordingly, the position ID "SS0001" is selected. In response to this, the node ID "SS0001N01" corresponding to the position ID "SS0001" of SS for which the selection was made first among the nodes stored in the node table 16a illustrated in FIG. 7 is retrieved. Next, a record of the node ID "SS0001N01" retrieved from the node table 16a is registered in the current node table 17a. Furthermore, the node ID "SS0001N01" retrieved from the node table 16a is registered also in the search list. In this case, only "SS0001N01" is registered as the node ID in the search list. Accordingly, the node ID "SS0001N01" is selected.

Then, the node $ID_1$ "SS0001N01" is retrieved among the "branches" stored in the "branch" table 16b illustrated in FIG. 8, and the "branch" of the equipment ID "SP0001" having the combination of the node $ID_1$ "SS0001N01" and the node $ID_2$ "PO0001N01" is found. After that, a record of the "branch" with the equipment ID "SP0001" retrieved from the "branch" table 16b is registered in the current "branch" table 17b. Furthermore, the equipment ID "SP0001" retrieved from the "branch" table 16b is registered in the search list. In this case, only "SP0001" is registered as the equipment ID in the search list. Accordingly, the equipment ID "SP0001" is selected.

Attribute information "a span 21 m, resistance $R_{H1}$, and reactance $X_{H1}$" of a "span" corresponding to the equipment ID "SP0001" for which the selection was made first is retrieved from the "span" table 15b illustrated in FIG. 6. Here, the case of retrieving the attribute information of the "span" was illustrated. However, in a case of an equipment ID beginning with a character string other than "SP", the attribute information is not retrieved from the "span" table 15b. Attribute information of a "unit" is retrieved from the "unit" table 15a illustrated in FIG. 5.

Based on the attribute information "span 21 m, resistance 220 Ω/m, reactance 150 Ω/m" obtained in this manner, a resistance value of 4621 (220×21)Ω, and a reactance value of 3150 (150×21)Ω are associated with the record of the "branch" of the equipment ID "SP0001" used for the retrieval from the "span" table 15b, and registered in the current "branch" table 17b.

"PO0001N01" is subsequently set as a value in the other node ID paired with the node ID "SS0001N01" used for the search for the combination of the node $ID_1$ "SS0001N01" and the node $ID_2$ "PO0001N01". In this manner, the other node ID is not blank. Therefore, the "branch" with the equipment ID "SP0001" is judged whether or not to be a switch. The value of the open/closed division of the "branch" with the equipment ID "SP0001" is blank so that the "branch" is not a switch. Hence, the record of the other node ID "PO0001N01" is retrieved from the node table 16a. The record of the other node ID "PO0001N01" is then registered in the current node table 17a of the power distribution system information 17. Furthermore, the other node ID "PO0001N01" is added as the unsearched node to the search list.

In this manner, no node IDs except the node ID "PO0001N01" are registered at the time of registering the other node ID "PO0001N01" as the unsearched node in the search list. Hence, the node ID "PO0001N01" is selected, and then the search is continued.

Here, the case where the other node ID is not blank was illustrated. However, when the other node ID is blank, a search is made for an unsearched "branch" registered in the search list. Moreover, if there is no unsearched "branch", a search is made for an unsearched node. If there is no unsearched position ID of SS, the search is ended. Moreover, here, the case where the "branch" is not a switch was illustrated. However, when the "branch" is a switch, a search for the other node ID, and further the addition of the other node to the search list are not executed unless the switch is in the switch closed state. This is because when a search for the other node ID and the addition of the other node to the search list are executed if the switch is in the switch open state, a different power distribution system that is not electrically connected is to be accidentally registered in the current node table 17a and the current "branch" table 17b.

The above search enables the creation of the current node table 17a that has retrieved, from among the "branches" registered in the node table 16a, nodes of the power distribution system where pieces of equipment are electrically interconnected at the point of making a search. Furthermore, the above search enables the creation of the current "branch" table 17b where "branches" of the power distribution system electrically interconnected at the point of making a search, and pieces of attribute information corresponding to the "branches" are associated after the retrieval of the "branches" and the pieces of attribute information from among the "branches" registered in the "branch" table 16b.

In the following description, the power distribution system where pieces of equipment are electrically interconnected at the point of making a search may be described as the "current system."

The power distribution system information 17 containing the current node table 17a and the current "branch" table 17b, which have been created in this manner, is registered in the storage unit 13. FIG. 9 is a diagram illustrating an example of the current node table 17a. FIG. 10 is a diagram illustrating an example of the current "branch" table 17b. These FIGS. 9 and 10 illustrate the current node table 17a and the current "branch" table 17b, which were created using the tables illustrated in FIGS. 4 to 8, where the node ID "SS0001N01" is set as the starting point.

As illustrated in FIG. 9, the amounts of power usage measured by meters such as smart meters are registered as examples of the attribute information in records of nodes "LL0001N01," "LL0002N01," "LL0003N01," "LL0004N01," "LL0005N01," "LL0006N01," "LL0007N01," and "LL0008N01" being connection points of pieces of load equipment of customers and pieces of equipment of the power distribution system among the records of the current node table 17a. Such amounts of power usage include "active power" that is consumed by the load equipment, and "reactive power" that is not consumed by the load equipment. Of them, the reactive power is also called lagging reactive power. The amount of power usage (active) and the amount of power usage (reactive) are referred to in a case of calculating a voltage at each node.

As illustrated in FIG. 10, the value of the open/closed division registered in the "branch" table 16b is registered in records that the equipment of a "branch" is a switch among the records of the current "branch" table 17b. For example, "1" is registered in the open/closed division for all switches with branch IDs "BR0002," "BR0006," and "BR0019". Accordingly, it indicates that the switches are in the switch closed state and in the conductive state. FIG. 10 illustrates the switches whose open/closed division is "1". However, if the open/closed division of the switch is "0", it indicates that the switch is in the switch open state, and is not in the conductive state. Moreover, a reactance value X and a resistance value R are registered as examples of the attribute information in each record of the current "branch" table 17b. The reactance value X and the resistance value R, which are registered in the "unit" table 15a, are registered as the distribution information as they are for equipment of a "branch" that is a "unit", for example, a switch or transformer among the records of the current "branch" table 17b. On the other hand, a value obtained by multiplying a reactance value per unit registered in the "span" table 15 by the value of a span is registered as the reactance value X, and a value obtained by multiplying a resistance value per unit by the value of a span as the resistance value R, for equipment of a "branch" that is a "span". The reactance values X and the resistance values R of the "unit" and "span" are referred to in the case of calculating a voltage at each node.

Here, the amount of power usage (active), the amount of power usage (reactive), the resistance value, and the reactance value were illustrated as parameters used for the calculation of a voltage. However, a voltage can be calculated more accurately by adding an item of a connection phase to which a transformer is connected to either the current node table 17a or the current "branch" table 17b. For example, if the power line is a single-phase three-wire, it is possible to set a first transformer connected to the power line on a pole as a "connection phase 1," a second transformer as a "connection phase 2," and a third transformer as a "connection phase 3," and register a value "A" in a case where the transformer is connected to the first and second wires of the three-wire power line, a value "B" in a case where a transformer is connected to the second and third wires, and a value "C" in a case where a transformer is connected to the first and third wires.

Figure 11:
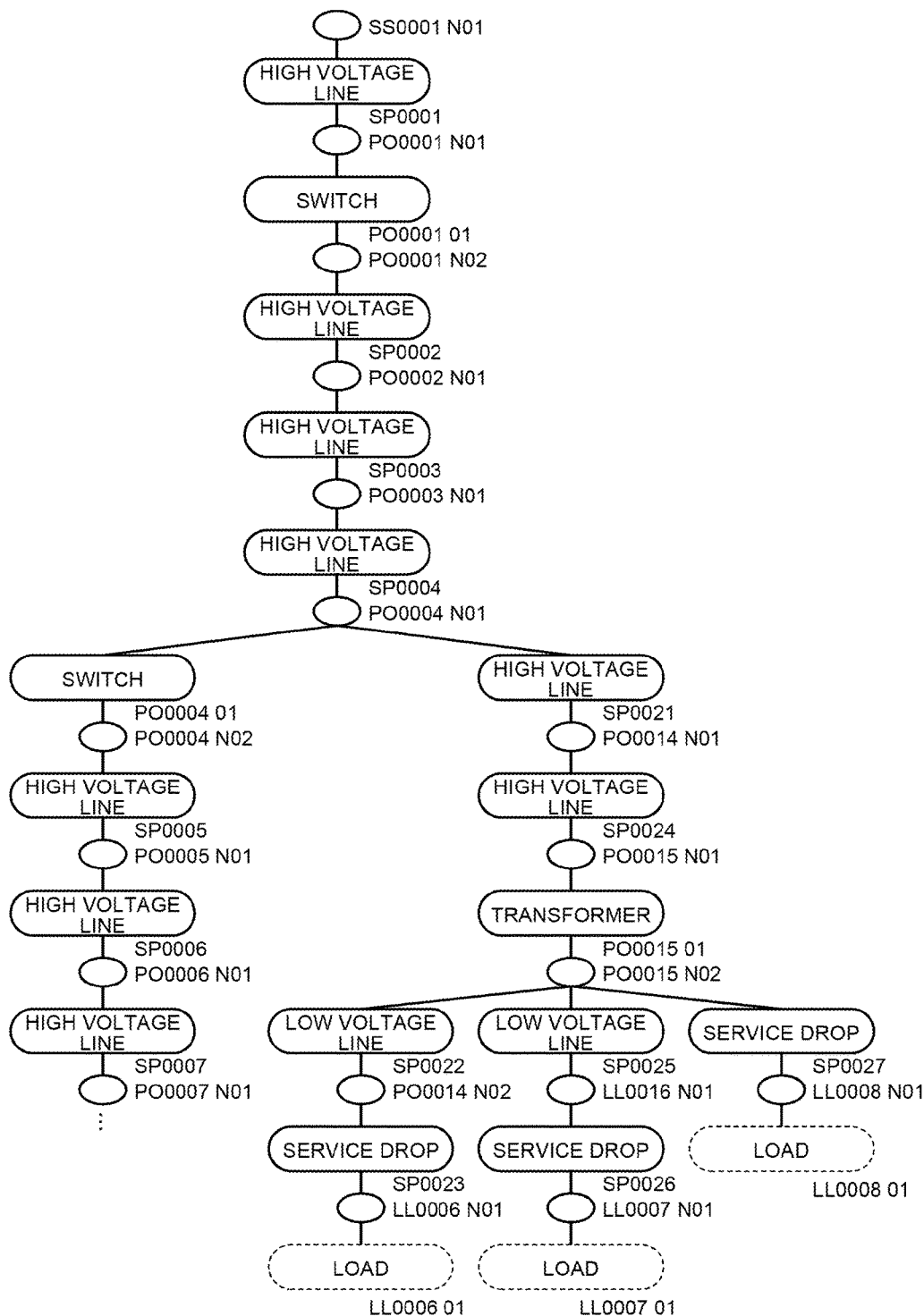
FIG. 11 is a diagram (1) illustrating an example of a graph structure of a power distribution system.
Figure 12:
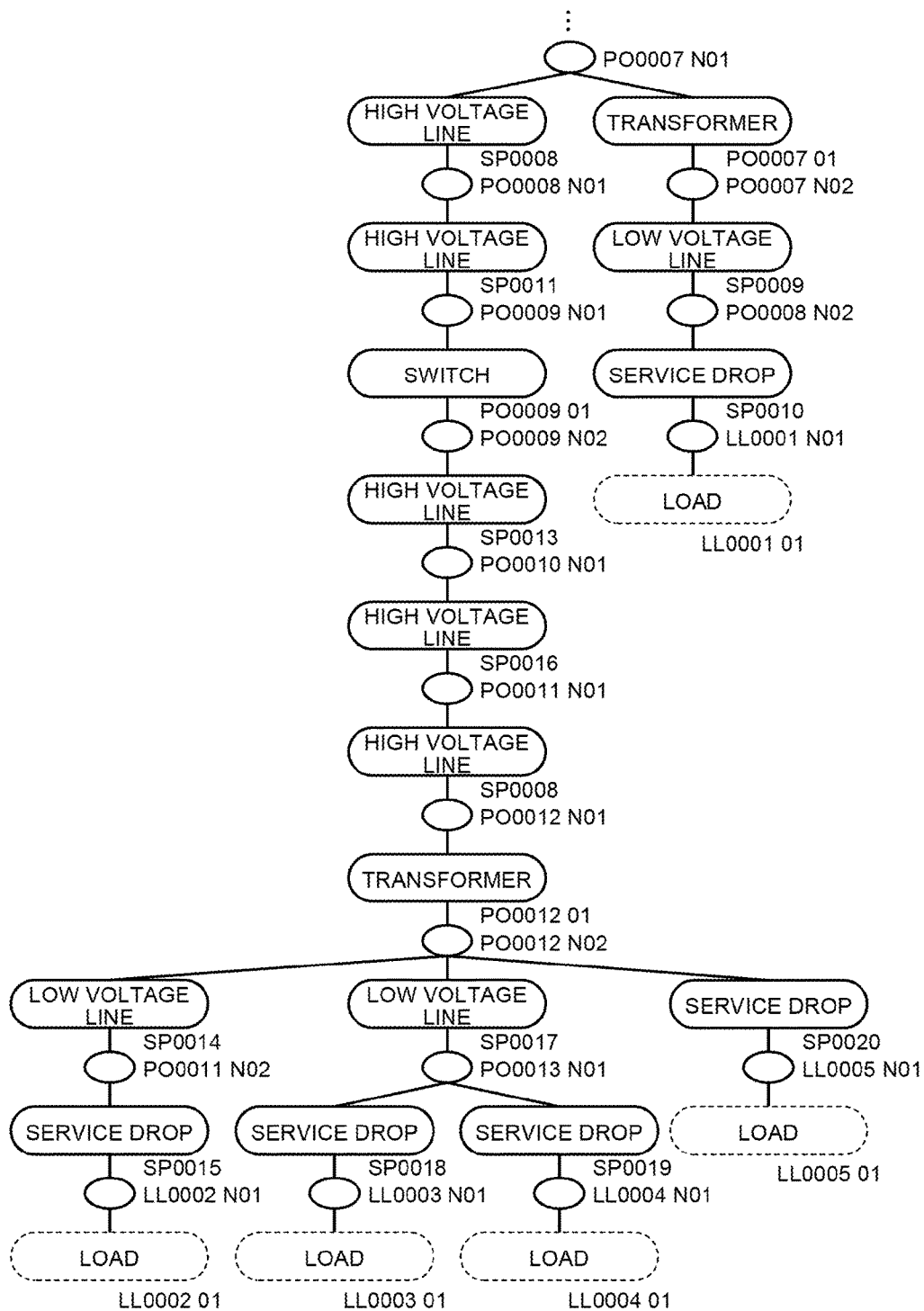
FIG. 12 is a diagram (2) illustrating an example of the graph structure of the power distribution system.

In this manner, the power distribution system information 17 created from the current node table 17a illustrated in FIG. 9, and the current "branch" table 17b illustrated in FIG. 10 represents a graph structure of the power distribution system illustrated in FIGS. 11 and 12.

FIGS. 11 and 12 are diagrams illustrating an example of the graph structure of the current system. The current system illustrated in FIGS. 11 and 12 has a node with the node ID "SS0001N01" being the connection point of the SS bank and the high voltage line of the equipment ID "SP0001", at a root (first layer) of a hierarchical structure. Furthermore, the current system has paths from the root toward eight pieces of load equipment with equipment IDs "LL000101," "LL000201," "LL000301," "LL000401," "LL000501," "LL000601," "LL000701," and "LL000801" being endpoints. It can be seen that of them, a hierarchy from the SS bank to the load equipment with the equipment ID "LL000801" is the shallowest, 10 layers, and hierarchies from the SS bank to the pieces of the load equipment with the equipment IDs "LL000201," "LL000301," and "LL000401" are the deepest, 19 layers. Furthermore, it indicates to have a combination pattern where all the switches of the switches with equipment IDs "PO000101," "PO000401," and "PO000901" are in the closed state whose open/closed division is "1", in other words, in a state where conduction is ON. Paths, controlled by one distribution substation, through which power is supplied between the substation and load equipment of customers, are formed by a combination pattern of the open and closed states of switches whose illustrations are omitted, including the switches with the equipment IDs "PO000101," "PO000401," and "PO000901."

In this manner, the above power distribution system information 17 is generated. Accordingly, it is possible to grasp electrical links of the current system by the segmentation into not such rough units as the high voltage system and the low voltage system, but units of the equipment, and further units of the connection point of pieces of equipment.

Return to the description of FIG. 1. The collection unit 19c is a processing unit that collects history information of current nodes and current "branches", which have been adopted as the current system. As an aspect, the collection unit 19c collects history information when the current node table 17a and the current "branch" table 17b are created. Here, from the viewpoint of the characteristic of the history information that the current nodes and "branches" in each time cross section are accumulated as the history, the collection unit 19c takes a state ID that identifies a state in order to identify the states of nodes and "branches" of each power distribution system for each time cross section. Here, the case of automatic registration upon the creation of the current node table 17a and the current "branch" table 17b was illustrated. However, the history information of current nodes and current "branches" may be collected at the instruction of the client terminal 30.

The collection unit 19c then associates records of the current nodes registered in the current node table 17a with the state ID after copying the records of the current nodes. In the following description, a node copied from a current node for the purpose of history management may be described as the "history node." After that, the collection unit 19c registers the records of the history nodes associated with the state ID in the history node table 18a included in the history information 18 stored in the storage unit 13. Consequently, current nodes in each time cross section are to be managed as the history.

Moreover, the collection unit 19c associates records of the current "branches" registered in the current "branch" table 17b with the state ID after copying the records of the current "branches". In the following description, a "branch" copied from a current "branch" for the purpose of history management may be described as the "history "branch"." After that, the collection unit 19c registers the records of the history "branches" associated with the state ID in the history "branch" table 18b included in the history information 18 stored in the storage unit 13. Consequently, current "branches" in each time cross section are to be managed as the history. This indicates that a history of combination patterns of the open and closed states of switches in the time cross sections is managed.

Furthermore, the collection unit 19c collects attribute information related to an environment where power is supplied in the current system. Examples of such attribute information include items such as a day of the week when the current system is adopted as the power supply path, a holiday classification, the amount of solar radiation, and the temperature. Of them, the day of the week and the holiday classification are collected by referring to a calendar, what is called calendar information. Moreover, the amount of solar radiation and the temperature are collected by referring to weather information. The calendar information and the weather information may be configured to be stored and managed in the storage unit 13, or may be configured to refer to those disclosed by an external apparatus. The collection unit 19c then associates the attribute information with a state ID and subsequently registers the state ID and the attribute information in the history ID table 18c included in the history information 18 stored in the storage unit 13.

Here, the history ID table 18c included in the history information 18 is described. As an aspect of such a history ID table 18c, data can be adopted in which items such as a state ID, a save year, month and day, a save time, a history year, month, and day, a history time, a history day of the week, a history holiday classification, a history amount of solar radiation, and a history temperature. Here, the items that have "save" assigned to the prefix among the above items are items related to saving in the history ID table 18c. The items that have "history" assigned to the prefix are items related to a time cross section when a history is collected. FIG. 13 is a diagram illustrating an example of the history ID table 18c. For example, a record of a state ID "S20120305-01" illustrated in FIG. 13 indicates that the record was saved at 11:30 on Mar. 5, 2012. Furthermore, the record of the state ID "S20120305-01" indicates that a time cross section when history nodes and history "branches" corresponding to the state ID were adopted as power supply paths is 11:30 on Monday, Mar. 5, 2012. Furthermore, the record of the state ID "S20120305-01" indicates that the history nodes and the history "branches" were adopted as the power supply paths in an environment where the amount of solar radiation was 2.25 KWh, and the temperature was 17.2 degrees. Here, the case where the holiday classification is "0", in other words, the case where it is not a national holiday or festival was described. However, if the holiday classification is "1", it indicates to be a national holiday or festival.

Furthermore, a description is given of the history node table 18a and the history "branch" table 18b, which are included in the history information. FIG. 14 is a diagram illustrating an example of the history node table 18a. FIG. 15 is a diagram illustrating an example of the history "branch" table 18b. FIG. 14 illustrates a case where the state ID "S20120305-01" was assigned to the contents of the records registered in the current node table 17a illustrated in FIG. 9, and registered in the history node table 18a. Moreover, FIG. 15 illustrates a case where the state ID "S20120305-01" was assigned to the contents of the records registered in the current "branch" table 17b illustrated in FIG. 10, and registered in the history "branch" table 18b. As illustrated in FIGS. 14 and 15, a copy having the same contents as the current node table 17a illustrated in FIG. 9 and the current "branch" table 17b illustrated in FIG. 10 except the addition of the state IDs is also registered in the history node table 18a and the history "branch" table 18b.

The calculation unit 19d is a processing unit that calculates the degree of similarity between attribute information specified by the client terminal 30 and attribute information included in the history information 18.

As an aspect, the calculation unit 19d accepts, from the client terminal 30, the specification of attribute information related to an environment where power is supplied. Examples of attribute information to be specified include the year, month, and day, the time, the day of the week, the holiday classification, the amount of solar radiation, and the temperature. When having accepted the specification of the attribute information from the client terminal 30, the calculation unit 19d reads the records stored in the history ID table 18c sequentially. Next, the calculation unit 19d classifies the records read from the history ID table 18c into date classifications "1" to "3". The date classification "1" indicates a weekday from Monday to Friday. The date classification "2" indicates Saturday. The date classification "3" indicates Sunday. However, a record corresponding to a holiday, even if it is a weekday, is classified as the date classification "3".

The calculation unit 19d then registers a state ID of a record whose date classification is the same as that of the attribute information specified by the client terminal 30, in a similar pattern list stored in the unillustrated internal memory. In such a similar pattern list, a state ID of a record is registered which has attribute information similar to the attribute information specified by the client terminal 30 among the records stored in the history ID table 18c. The calculation unit 19d subsequently executes the classification of the date classification and registration in the similar pattern list, targeting all the records stored in the history ID table 18c.

In this manner, records are narrowed down to those similar in the specified date classification to be registered in the similar pattern list. Accordingly, only combination patterns of the open and closed states of switches whose operating trends of load equipment of customers are common can be targeted for extraction. For example, if the customer is a home, there is a trend where the customer is not at home during the daytime on weekdays and the load equipment is operated less while the customer is at home on weekends and the load equipment is operated more. Moreover, in cases of offices and factories, they are normally in operation during the daytime on weekdays and the load equipment is operated more while they are off on weekends and the load equipment is operated less. The combination patterns of the open and closed states of switches whose operating trends of the load equipment of customers are common can be estimated to be useful when voltage is adjusted to be prevented from exceeding the tolerance range at connection points of load equipment of customers and equipment of the power distribution system.

After finishing the registration in the above similar pattern list, the calculation unit 19d calculates the degree of similarity between the attribute information specified by the client terminal 30 and the attribute information included in the similar pattern list. For example, the calculation unit 19d obtains a difference in time, a difference in temperature, and a difference in the amount of solar radiation, and makes a calculation of multiplying differences in each of time, temperature, and the amount of solar radiation even number of times. At this point in time, exponentiation is for taking an absolute value if the differences take a negative value. It is presumed that an error increases as the number of times of multiplications for exponentiation is increased. Accordingly, a case of calculating a square is assumed in the example. The calculation unit 19d subsequently calculates the degree of similarity by adding the squared value of the difference in time, the squared value of the difference in temperature, and the squared value of the difference in the amount of solar radiation. Next, the calculation unit 19d associates the degree of similarity calculated in the above manner with a state ID in the similar pattern list. The calculation unit 19d then takes the above degree of similarity calculation for records of all the state IDs registered in the similar pattern list. The method for calculating the degree of similarity is not limited to the method described herein. However, any existing method for calculating the degree of similarity can be adopted.

The smaller value of such a degree of similarity indicates that the attribute information specified by the client terminal 30, the attribute information included in the history information 18, and the attribute information included in the similar pattern list are more similar. In this manner, the reason to calculate the degree of similarity including the time and temperature is that it is possible to assume that if the time slot and the temperature are closer, the operating trend of load equipment of a customer also becomes similar. Furthermore, the reason to calculate the degree of similarity including the amount of solar radiation is that it is possible to assume that if the amount of solar radiation is closer, the amount of power generation of a distributed energy resource installed at a customer's premise also becomes similar.

The extraction unit 19e is a processing unit that extracts a combination pattern of the open and closed states of switches whose degree of similarity satisfies a predetermined condition among the history information 18. As an aspect, the extraction unit 19e rearranges the state IDs in the similar pattern list in such a manner as that the degrees of similarity are in ascending order. At this point in time, if the degree of similarity indicating a higher degree of similarity with increasing value is calculated, sorting is executed in descending order. Next, the extraction unit 19e extracts a predetermined descending number of state IDs, for example, the top-three state IDs, registered in the similar pattern list where the degrees of similarity have been rearranged in ascending order. Here, the case of extracting the predetermined descending number was illustrated. However, it may be configured to extract state IDs having the degree of similarity equal to or less than a predetermined threshold value. After that, the extraction unit 19e extracts "branches" having a value set in the open/closed division of the switch among the history "branches" corresponding to the state IDs extracted from the similar pattern list, and then outputs, to the client terminal 30, a combination pattern of the open/closed divisions of switches.

A specific example of the extraction of a combination pattern is described here using FIGS. 16 and 17. FIG. 16 is a diagram illustrating an example of specified attribute information. FIG. 17 is a diagram illustrating an example of an extraction result of state IDs from the similar pattern list. In the example, a case is illustrated in which if the attribute information illustrated in FIG. 16 has been accepted, the degrees of similarity to the attribute information of the records registered in the history ID table 18c illustrated in FIG. 13 are calculated to extract a similar pattern.

As illustrated in FIG. 16, a case is assumed in which the year, month, and day "2012 Apr. 30", the time "13:00", the day of the week "mon", the holiday classification "1", the amount of solar radiation "2.12", and the temperature "15.2" are specified as the attribute information. In this case, the date classification of the specified attribute information is a holiday. Hence, among the records registered in the history ID table 18c illustrated in FIG. 13, state IDs "S20120320-01", "S20120320-02", "S20120324-01", and "S20120324-02", which have "3" in the day classification, are to be registered in the similar pattern list.

Of them, in terms of the degree of similarity between the specified attribute information and the attribute information of the state ID "S20120320-01", a difference in time is calculated as "0.014667=1/24", a difference in the amount of solar radiation as "−0.2", and a difference in temperature "−1.9". Their squared values are calculated as "0.001736", "0.04", and "3.61". Hence, the degree of similarity being the total value of the squared values is calculated as "3.651736". Here, the case was illustrated in which a difference in time is converted into the unit of day by dividing the difference in time by 24 hours to prevent only the time value from becoming relatively larger than the other items.

Moreover, in terms of the degree of similarity between the specified attribute information and the attribute information of the state ID "S20120320-02", a difference in time is calculated as "0.125=3/24", a difference in the amount of solar radiation as "−0.1", and a difference in temperature "−1.3". Their squared values are calculated as "0.015625", "0.01", and "1.69". Hence, the degree of similarity being the total value of the squared values is calculated as "1.715625". Furthermore, in terms of the degree of similarity between the specified attribute information and the attribute information of the state ID "S20120324-01", a difference in time is calculated as "0.125=3/24", a difference in the amount of solar radiation as "0.24", and a difference in temperature "−0.5". Their squared values are calculated as "0.015625", "0.0576", and "0.25". Hence, the degree of similarity being the total value of the squared values is calculated as "0.323225". Moreover, in terms of the degree of similarity between the specified attribute information and the attribute information of the state ID "S20120324-02", a difference in time is calculated as "0.125=3/24", a difference in the amount of solar radiation as "0.34", and a difference in temperature "−0.7". Their squared values are calculated as "0.001736", "0.1156", and "0.49". Hence, the degree of similarity being the total value of the squared values is calculated as "0.607336".

If the degrees of similarity of the state IDs "S20120320-01", "S20120320-02", "S20120324-01", and "S20120324-02" are rearranged in ascending order, the order is "S20120324-01", "S20120324-02", and "S20120320-02". Therefore, "branches" having a value set in the open/closed division of the switch are extracted from among the history "branches" corresponding to the state IDs "S20120324-01", "S20120324-02", and "S20120320-02". A combination pattern of the open/closed divisions of the switches is then output to the client terminal 30.

The combination pattern of the open/closed divisions of the switches output in this manner can be made effective use of if voltage is adjusted by the remote operation of the switches to be prevented from exceeding the tolerance range at connection points of load equipment of customers and equipment of the power distribution system. For example, if there is no node beyond the tolerance range in a case where a voltage at each node, in addition to a graph structure of each power distribution system formed by the combination pattern of the open/closed divisions of the switches, is output to the client terminal 30, the combination pattern of the open/closed divisions of the switches can be adopted as it is. Even if there is a node beyond the tolerance range, the combination pattern of the open/closed divisions of the switches can be made effective use of for the remote operation of the switches by slightly modifying the open/closed state of a switch related to the node part beyond the tolerance range based on the node beyond the tolerance range. Hence, the voltage can be adjusted without going for construction work such as the adjustment of a tap of a pole transformer, even if simply adjusting the transmission voltage of the substation is not sufficient.

Various integrated circuits and electronic circuits can be adopted for the control unit 19. Moreover, a part of the functional units of the control unit 19 can also be designed to be another integrated circuit or electronic circuit. Examples of the integrated circuit include an ASIC (Application Specific Integrated Circuit). Moreover, examples of the electronic circuit include a CPU (Central Processing Unit) and an MPU (Micro Processing Unit).

[Flows of Processes]

Next, the flows of processes of the power distribution management apparatus 10 according to the example are described. Here, a description is given as follows: (1) a power distribution management process, and then (2) the pattern extraction process, which are executed by the power distribution management apparatus 10.

(1) Power Distribution Management Process

Figure 18:
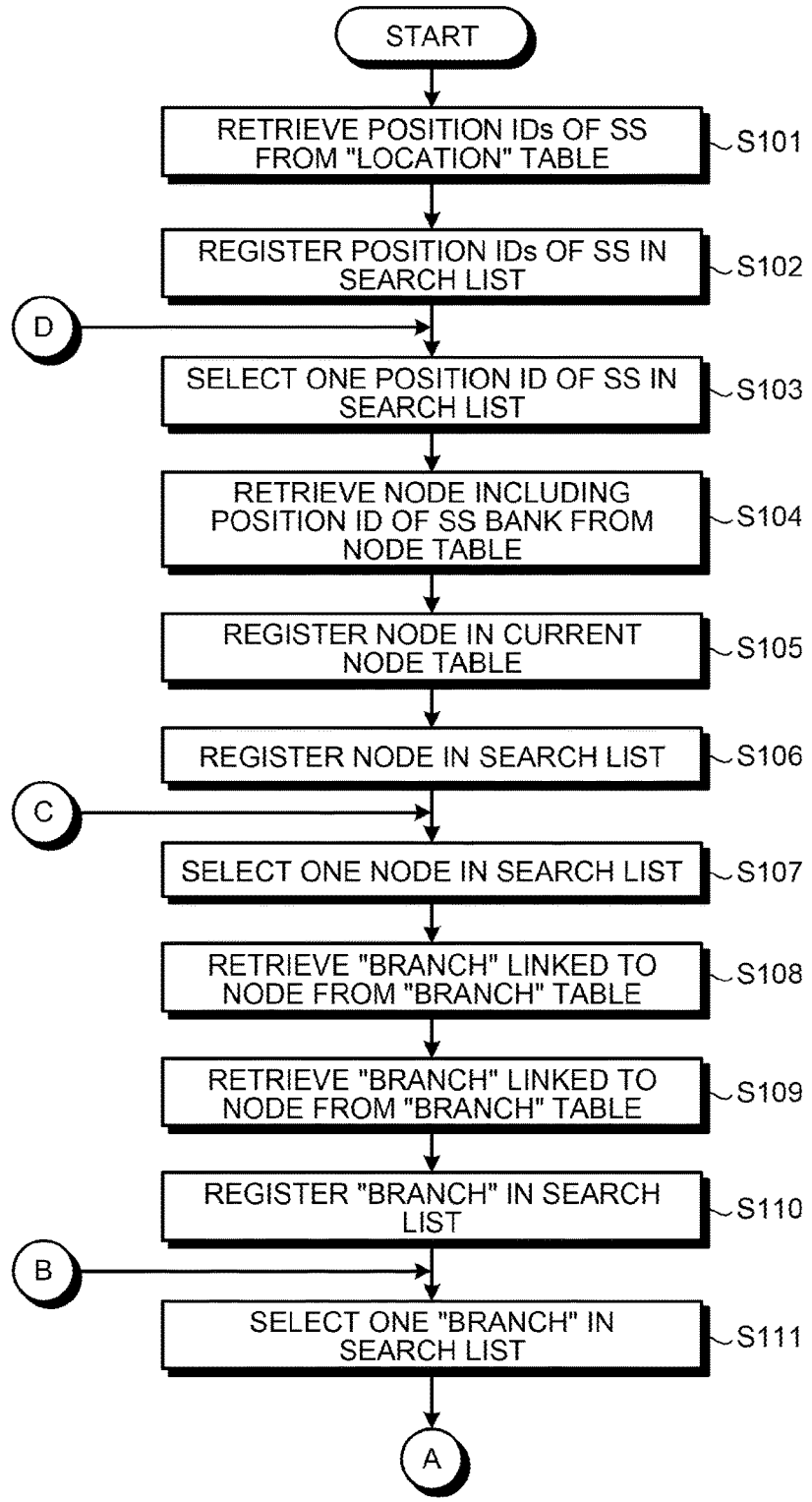
FIG. 18 is a flowchart (1) illustrating the procedure of a power distribution management process according to a first embodiment.
Figure 19:
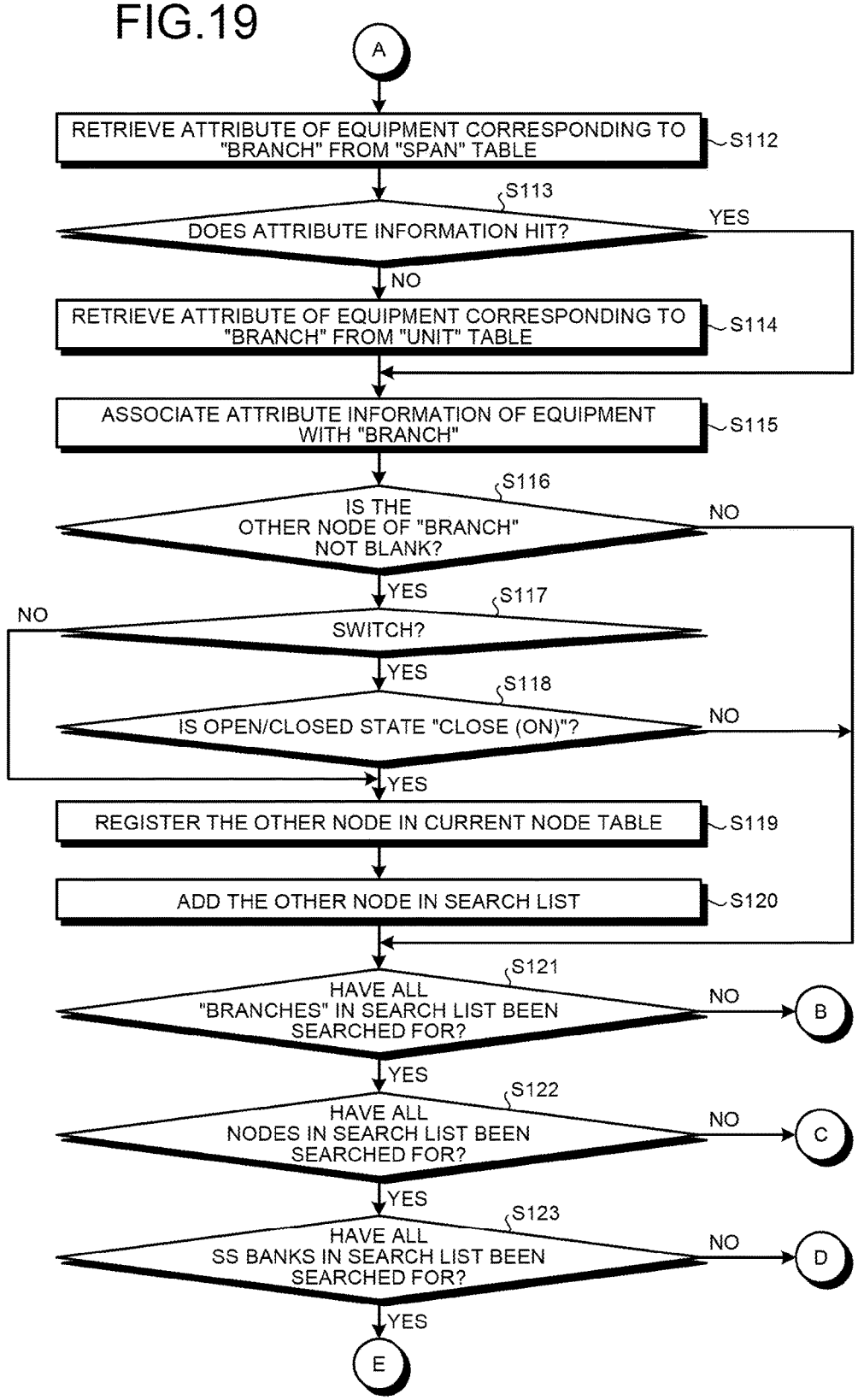
FIG. 19 is a flowchart (2) illustrating the procedure of the power distribution management process according to the first embodiment.
Figure 20:
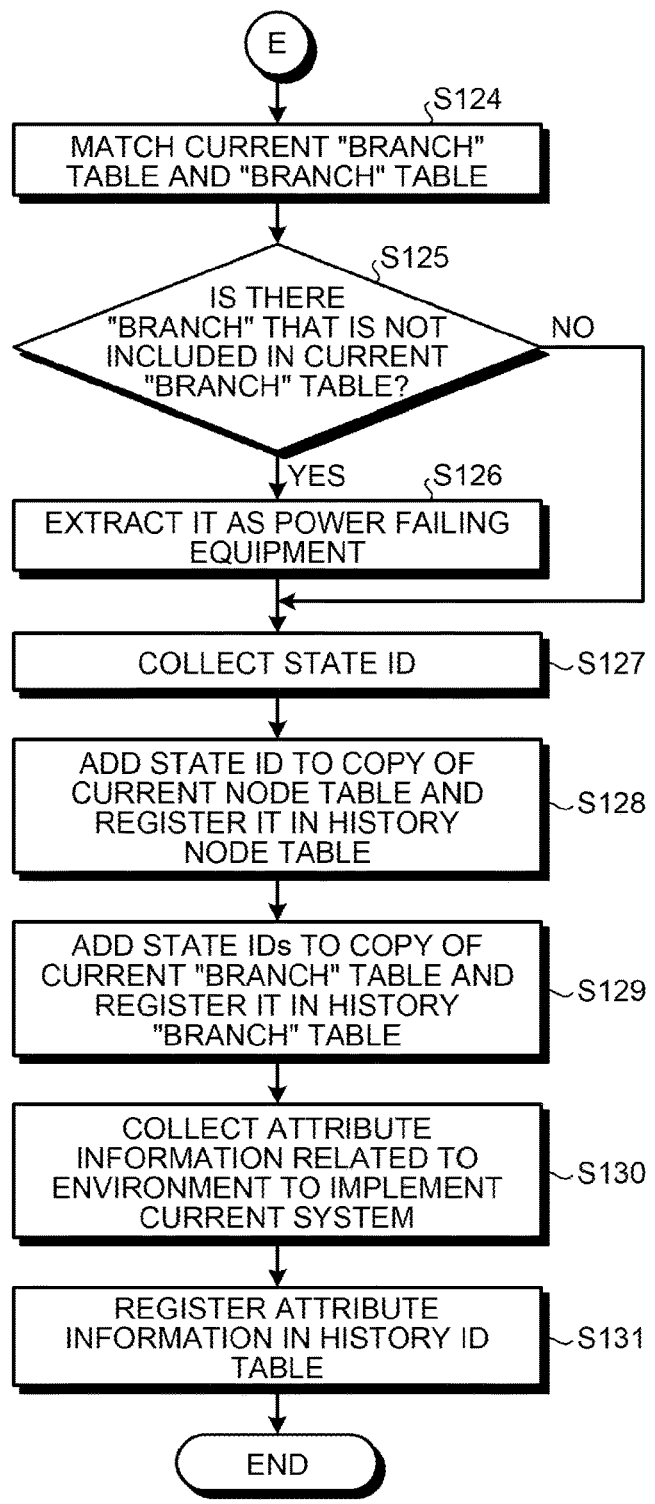
FIG. 20 is a flowchart (3) illustrating the procedure of the power distribution management process according to the first embodiment.

FIGS. 18 to 20 are flowcharts illustrating the procedure of the power distribution management process according to the first embodiment. The power distribution management process is started if a request to view a power distribution system screen has been accepted via the client terminal 30, or if a fixed period has passed since the previous execution of the process.

As illustrated in FIG. 18, the retrieval unit 19a retrieves position IDs whose position type is the distribution substation "SS" among the position IDs stored in the "location" table 14a (Step S101). The retrieval unit 19a then registers the position IDs of SS retrieved from the "location" table 14a in the search list (Step S102).

Next, the retrieval unit 19a selects one position ID of SS registered in the search list (Step S103). The retrieval unit 19a then retrieves a node corresponding to the position ID of SS for which the selection was made first among the nodes stored in the node table 16a (Step S104).

After that, the retrieval unit 19a registers a record of the node retrieved from the node table 16a in the current node table 17a stored as the power distribution system information 17 in the storage unit 13 (Step S105). Furthermore, the retrieval unit 19a registers, in the search list, the node retrieved from the node table 16a (Step S106).

The retrieval unit 19a then selects one node registered in the search list (Step S107). Next, the retrieval unit 19a retrieves a record of a "branch" having a combination of node IDs including the node selected in Step S107, in other words, a combination of the node $ID_1$ and the node $ID_2$, among the "branches" stored in the "branch" table 16b (Step S108).

After that, the retrieval unit 19a registers, in the current "branch" table 17b, the record of the "branch" retrieved in Step S108 (Step S109). Furthermore, the retrieval unit 19a registers, in the search list, the "branch" retrieved in Step S108 (Step S110). Next, the retrieval unit 19a selects one "branch" registered in the search list (Step S111).

As illustrated in FIG. 19, the retrieval unit 19a then retrieves attribute information corresponding to an equipment ID of the "branch" selected in Step S111 from the "span" table 15b (Step S112). At this point in time, if the retrieval of the attribute information from the "span" table 15b failed, in other words, if the attribute information did not hit (No in Step S113), the retrieval unit 19a executes the following processing.

In other words, the retrieval unit 19a retrieves the attribute information corresponding to the equipment ID of the "branch" selected in Step S111 from the "unit" table 15a (Step S114). If the retrieval of the attribute information from the "span" table 15b was successful (Yes in Step S113), the processing of Step S114 is skipped to shift to the processing of Step S115.

The association unit 19b then associates the attribute information of the "branch" used for the retrieval from the "span" table 15b or the "unit" table 15a among the records stored in the current "branch" table 17b, with the record of the "branch", and registers the attribute information of the "branch" (Step S115).

The retrieval unit 19a subsequently judges whether or not the other node is blank which is paired with the node used for the search in Step S108 among the combination of the nodes of the "branch" retrieved in Step S108 (Step S116).

At this point in time, if the other node is not blank (Yes in Step S116), the retrieval unit 19a further judges whether or not the "branch" is a switch (Step S117). If the "branch" is a switch (Yes in Step S117), then the retrieval unit 19a further judges whether or not the switch is in the switch closed state, in other words, whether or not the switch is in the ON state (Step S118).

Here, if the switch is in the ON state (Yes in Step S118), the retrieval unit 19a retrieves a record of the other node from the node table 16a and then registers the record in the current node table 17a of the power distribution system information 17 (Step S119). Furthermore, the retrieval unit 19a adds the other node as the unsearched node to the search list (Step S120).

Moreover, also if the "branch" is not a switch (No in Step S117), the retrieval unit 19a retrieves the record of the other node from the node table 16a and then registers the record in the current node table 17a of the power distribution system information 17 (Step S119). Furthermore, the retrieval unit 19a adds the other node as the unsearched node to the search list (Step S120).

On the other hand, if the other node is blank, or if the switch is in the OFF state (NO in Step S116 or No in Step S118), execution shifts to the processing of Step S121.

The retrieval unit 19a subsequently judges whether or not to have searched for all the "branches" registered in the search list (Step S121). At this point in time, if not all the "branches" registered in the search list have been searched for (No in Step S121), an unsearched "branch" is selected (Step S111), and then the processing from Step S112 to Step S120 is repeatedly executed.

If all the "branches" registered in the search list have subsequently been searched for (Yes in Step S121), the retrieval unit 19a judges whether or not all the nodes registered in the search list have been searched for (Step S122). At this point in time, if not all the nodes registered in the search list have been searched for (No in Step S122), an unsearched node is selected (Step S107), and then the processing form Steps S108 to Step S121 is repeatedly executed.

If all the nodes registered in the search list have been searched for (Yes in Step S122), the retrieval unit 19a judges whether or not all the position IDs of SS registered in the search list have been searched for (Step S123). At this point in time, if not all the position IDs of SS registered in the search list have been searched for (No in Step S123), an unsearched position ID of SS is selected (Step S103), and then the processing form Steps S104 to Step S122 is repeatedly executed.

If all the position IDs of SS registered in the search list have been searched for (Yes in Step S123), then the retrieval unit 19a matches the records of the "branches" stored in the "branch" table 16b and the records of the "branches" stored in the current "branch" table 17b as illustrated in FIG. 20 (Step S124).

Here, if the "branch" table 16b contains a record of a "branch" that does not match with the current "branch" table 17b (Yes in Step S125), the retrieval unit 19a detects equipment with an equipment ID included in the record of the "branch" as a power failure spot (Step S126). On the other hand, if the "branch" table 16b contains no record of a "branch" that does not match with the current "branch" table 17b (No in Step S125), execution shifts to Step S127 without executing the processing of Step S126.

The collection unit 19c then takes a state ID that identifies a state to identify the states of the nodes and "branches" of each power distribution system per time cross section (Step S127). Next, the collection unit 19c copies records of the current nodes registered in the current node table 17a, and then registers the records of the current nodes in the history node table 18a, adding the state ID to the records of the current nodes (Step S128).

Moreover, the collection unit 19c copies records of the current "branches" registered in the current "branch" table 17b, and then registers the records of the current "branches" in the history "branch" table 18b, adding the state ID to the records of the current "branches" (Step S129).

The collection unit 19c subsequently collects attribute information related to an environment where power is supplied in the current system (Step S130). After that, the collection unit 19c associates the attribute information with the state ID, then registers the state ID and the attribute information in the history ID table 18c included in the history information 18 stored in the storage unit 13 (Step S131), and ends the process.

(2) Pattern Extraction Process

Figure 21:
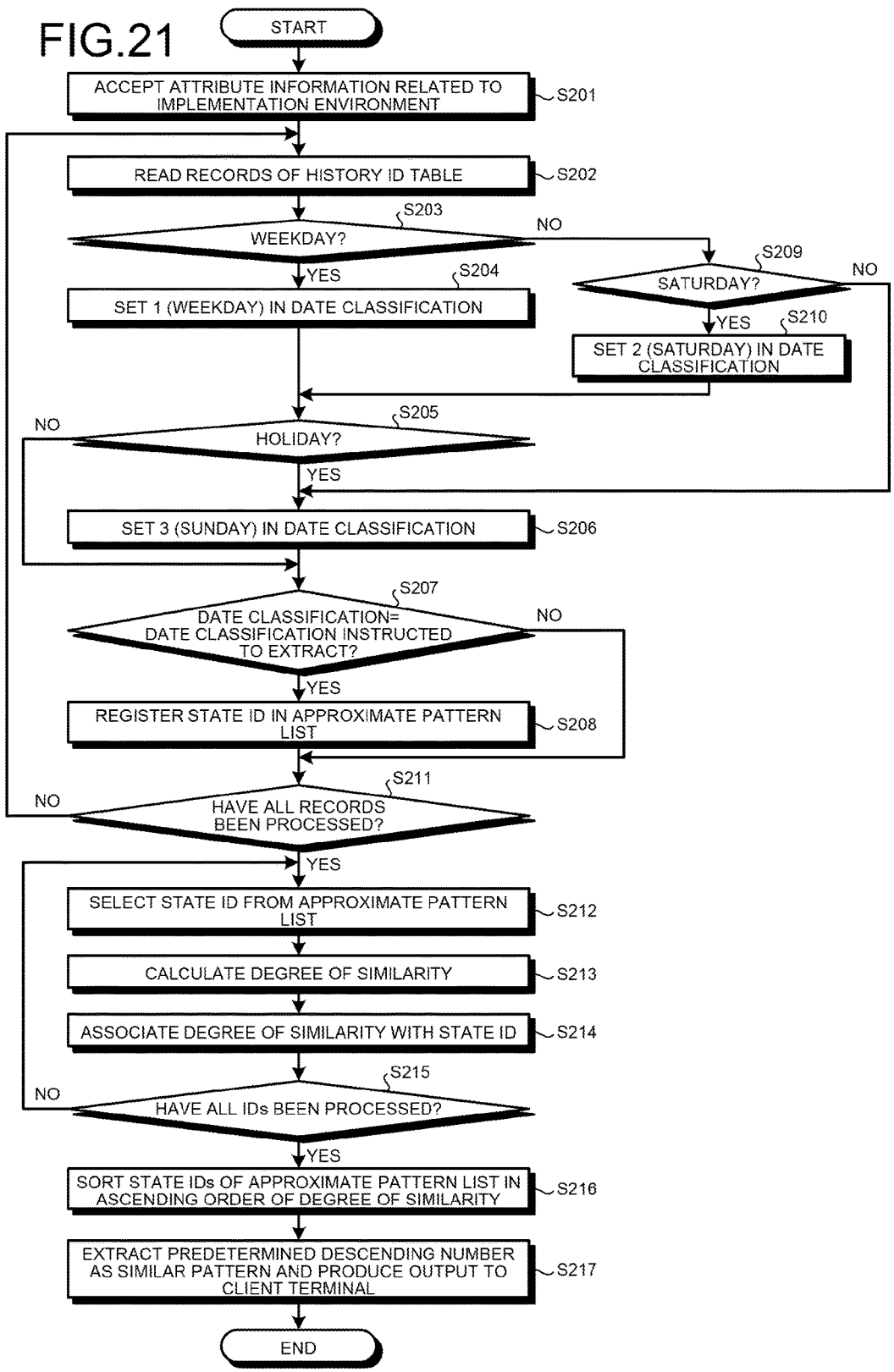
FIG. 21 is a flowchart illustrating the procedure of a pattern extraction process according to the first embodiment.

FIG. 21 is a flowchart illustrating the procedure of the pattern extraction process according to the first embodiment. The pattern extraction process is executed at times, such as when a request to extract a combination pattern has been accepted from the client terminal 30.

As illustrated in FIG. 21, when attribute information has been specified by the client terminal 30 (Step S201), the calculation unit 19d reads the records stored in the history ID table 18c sequentially (Step S202).

The calculation unit 19d then judges whether or not the day of the week of a record read from the history ID table 18c corresponds to a weekday (Step S203). At this point in time, if the day of the week is a weekday (Yes in Step S203), the calculation unit 19d sets "1" representing a weekday in the date classification of the record (Step S204).

The calculation unit 19d subsequently judges whether or not the holiday classification of the record read in Step S202 is the one representing a holiday, in other words, whether or not the holiday classification is "1" (Step S205). At this point in time, if the holiday classification is "1" (Yes in Step S205), the calculation unit 19d sets "3" representing a holiday again in the date classification of the record (Step S206). If the holiday classification is "0" (No in Step S205), execution shifts to the processing of Step S207 without executing the processing of Step S206.

If the date classification is the same as that of the attribute information specified by the client terminal 30 (Yes in Step S207), then the calculation unit 19d registers a state ID of the record in the similar pattern list stored in the unillustrated internal memory (Step S208). If the date classification is different (No in Step S207), execution shifts to the processing of Step S211 without executing the processing of Step S208.

On the other hand, if the day of the week is a weekday (No in Step S203), the calculation unit 19d judges whether or not the day of the week of the record read in Step S202 is Saturday (Step S209). At this point in time, if the day of the week is Saturday (Yes in Step S209), "2" representing Saturday is set in the date classification of the record (Step S210).

The calculation unit 19d subsequently judges whether or not the holiday classification of the record read in Step S202 is the one representing a holiday, in other words, whether or not the holiday classification is "1" (Step S205). At this point in time, if the holiday classification is "1" (Yes in Step S205), the calculation unit 19d sets "3" representing a holiday again in the date classification of the record (Step S206).

Moreover, if the day of the week is not Saturday either (No in Step S209), the only possibility left is Sunday. Accordingly, "3" representing a holiday is set in the date classification of the record (Step S206).

If the date classification is the same as that of the attribute information specified by the client terminal 30 (Yes in Step S207), then the calculation unit 19d registers a state ID of the record in the similar pattern list stored in the unillustrated internal memory (Step S208).

The above processing of Steps S202 to S210 is repeatedly executed until the process has been executed for all the records stored in the history ID table 18c (No in Step S211). If the process has been executed for all the records (Yes in Step S211), then execution shifts to the processing of the next Step S212.

Next, the calculation unit 19d selects a state ID registered in the similar pattern list (Step S212). The calculation unit 19d then calculates the degree of similarity between the attribute information specified by the client terminal 30 and the attribute information included in the similar pattern list (Step S213). Next, the calculation unit 19d associates the degree of similarity calculated in Step S213 with the state ID in the similar pattern list (Step S214).

The above processing of Steps S212 to S214 is repeatedly executed until the process ends for the records of all the state IDs registered in the similar pattern list (No in Step S215).

When the process subsequently ends for the records of all the state IDs registered in the similar pattern list (Yes in Step S215), the extraction unit 19e rearranges the state IDs in the similar pattern list in such a manner as that the degrees of similarity are in ascending order (Step S216). Next, the extraction unit 19e extracts a predetermined descending number of the state IDs, for example, the top-three state IDs, registered in the similar pattern list where the degrees of similarity have been rearranged in ascending order, produces an output to the client terminal 30 (Step S217), and ends the process. In terms of the information to be output, information registered in the similar pattern list corresponding to the extracted state IDs is output. Moreover, a graph structure of a power distribution system may be created and output from the history node table 18a and the history "branch" table 18b corresponding to the extracted state IDs. Furthermore, information that can distinguish a difference between a graph structure of the current power distribution system and a graph structure of the power distribution system corresponding to the extracted state IDs may be output.

[Effects of First Embodiment]

As described above, the power distribution management apparatus 10 according to the example extracts a combination pattern similar to specified attribute information from among combination patterns of the open and closed states of switches adopted in the past as a power supply path of a power distribution system. Hence, the power distribution management apparatus 10 according to the example can present a combination pattern of the open and closed states of switches to which a reverse flow has been added. As a result, it becomes possible to refer to a result output to the terminal, select an optimum combination pattern of switches, and switch the switches. Therefore, the power distribution management apparatus 10 according to the example can suppress the power beyond the tolerance range of voltage from flowing in the power distribution system.

Second Embodiment

The embodiment related to the apparatus of the disclosure has hitherto been described. However, the present invention may be carried out in various different modes other than the above-mentioned embodiment. Hence, another embodiment included in the present invention is hereinafter described.

[Application Example of Attribute Information]

In the above first embodiment, the date classification, the time, the temperature, the amount of solar radiation, and the like were illustrated as the attribute information. However, it is also possible to calculate the degree of similarity taking, as the attribute information, the number of customers possessing a distributed energy resource, the total value of power generation capacity of distributed energy resources for power generation, or the like. In other words, the number of customers possessing a distributed energy resource, or the total value of power generation capacity of distributed energy resources is further registered in the history ID table. Furthermore, the calculation unit 19d calculates the degree of similarity between the number of customers possessing a specified distributed energy resource and the number of customers possessing a distributed energy resource registered in the history ID table, or calculates the degree of similarity between the total value of power generation capacity of the specified distributed energy resources and the total value of power generation capacity of the distributed energy resources registered in the history ID table. Consequently, it further becomes possible to extract a combination pattern where the state of a reverse flow is similar.

[Distribution and Integration]

Moreover, the illustrated components of each device are not necessarily needed to be configured physically as illustrated. In other words, specific modes of the distribution/ integration of the devices are not limited to those illustrated. All or part of them can be configured by being distributed/integrated functionally or physically in any units in accordance with various loads and use states. For example, the retrieval unit 19a, the association unit 19b, the collection unit 19c, the calculation unit 19d, or the extraction unit 19e may be connected as an external device of the power distribution management apparatus 10 via a network. Moreover, the retrieval unit 19a, the association unit 19b, the collection unit 19c, the calculation unit 19d, and the extraction unit 19e may be respectively held by other devices, and connected to a network to cooperate. Accordingly, the above functions of the power distribution management apparatus 10 may be realized.

[Pattern Extraction Program]

Moreover, the various processes described in the above example can be realized by executing a program prepared in advance on a computer such as a personal computer or workstation. Hence, in the following description, a description is given of an example of a computer that executes the pattern extraction program having similar functions to the above example, with reference to FIG. 22.

Figure 22:
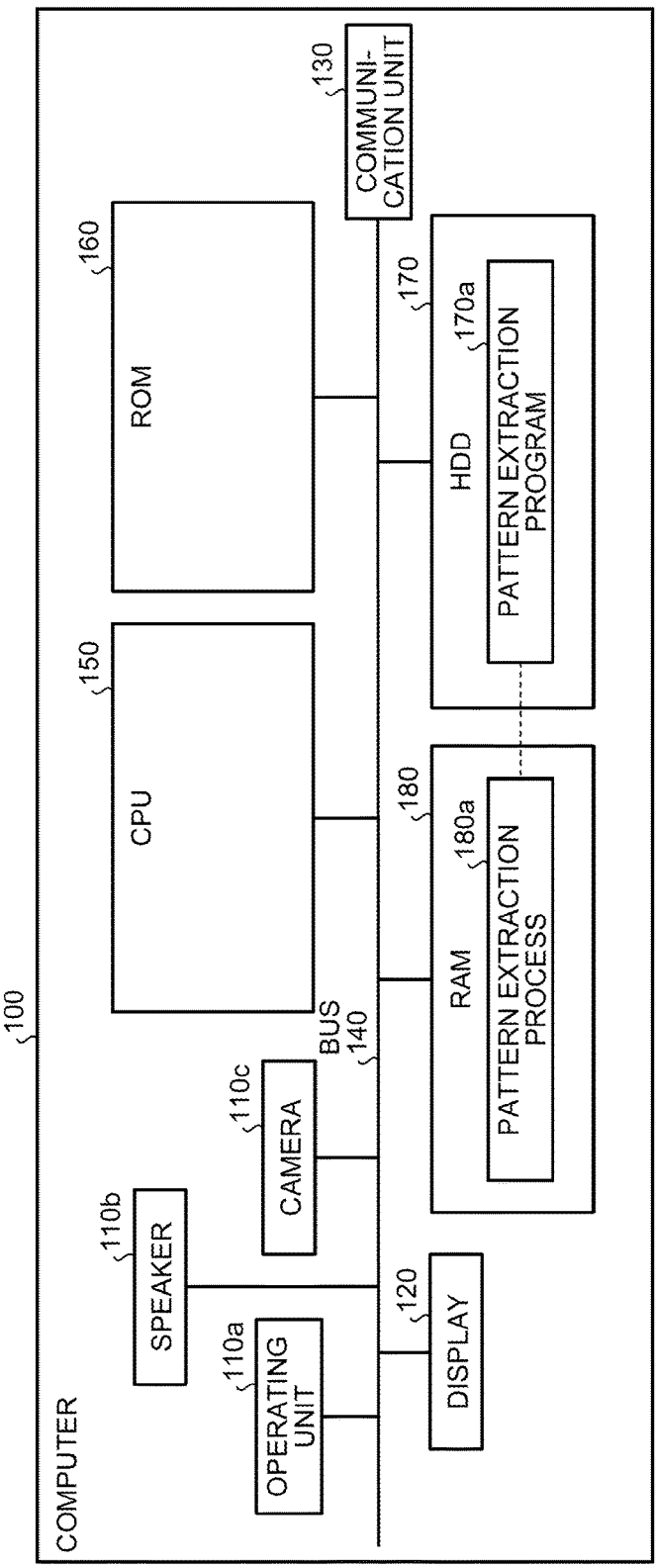
FIG. 22 is a diagram illustrating an example of a computer that executes a pattern extraction program according to the first embodiment and a second embodiment.

FIG. 22 is a diagram illustrating an example of a computer that executes the pattern extraction program according to the first and second embodiments. As illustrated in FIG. 22, a computer 100 includes an operating unit 110a, a speaker 110b, a camera 110c, a display 120, and a communication unit 130. Furthermore, the computer 100 includes a CPU 150, ROM 160, an HDD 170, and RAM 180. The units 110 to 180 are connected via a bus 140.

As illustrated in FIG. 22, a pattern extraction program 170a that exhibits similar functions to the retrieval unit 19a, the association unit 19b, the collection unit 19c, the calculation unit 19d, and the extraction unit 19e illustrated in the above first embodiment is stored in advance in the HDD 170. The pattern extraction program 170a may be integrated or distributed as appropriate, as with the components of the retrieval unit 19a, the association unit 19b, the collection unit 19c, the calculation unit 19d, and the extraction unit 19e illustrated in FIG. 1. In other words, not all data to be stored in the HDD 170 is always needed to be stored in the HDD 170. It is sufficient if only data necessary for a process is stored in the HDD 170.

The CPU 150 then reads the pattern extraction program 170a from the HDD 170 and develops it in the RAM 180. Consequently, the pattern extraction program 170a functions as a pattern extraction process 180a as illustrated in FIG. 22. The pattern extraction process 180a develops various types of data read from the HDD 170 in an area assigned to itself in the RAM 180 as appropriate, and executes various processes based on the developed various types of data. The pattern extraction process 180a includes the processes to be executed by the retrieval unit 19a, the association unit 19b, the collection unit 19c, the calculation unit 19d, and the extraction unit 19e illustrated in FIG. 1, for example, the processes illustrated in FIGS. 18 to 21. Moreover, not all the processing units to be virtually realized on the CPU 150 always need to operate on the CPU 150. Only a processing unit necessary for a process may be virtually realized.

The above pattern extraction program 170a is not necessarily stored in the HDD 170 or the ROM 160 from the beginning. For example, programs are stored in "portable physical media" such as flexible disks, what is called FD, CD-ROMs, DVD disks, magneto-optical disks, and IC cards, which are inserted into the computer 100. The computer 100 may be configured to acquire and execute the programs from these portable physical media. Moreover, it may be configured such that the programs are stored in another computer, a server apparatus, or the like that is connected to the computer 100 via a public line, the Internet, a LAN, a WAN, or the like, and the computer 100 acquires and executes the programs therefrom.

According to one embodiment, it is possible to suppress the power beyond a tolerance range of voltage from flowing in a power distribution system.

All examples and conditional language provided herein are intended for the pedagogical purposes of aiding the reader in understanding the invention and the concepts contributed by the inventors to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A power distribution management apparatus comprising:
    a memory configured to store history information including a pattern of open and closed states of switches that switch a path that supplies power between a substation and load equipment of a customer, and attribute information related to an environment where the power is supplied;
    a processor configured to execute a process including:
    upon acceptance of specification of the attribute information related to the environment, calculating a degree of similarity between the specified attribute information and attribute information included in the history information; and
    extracting a pattern of the open and closed states of switches whose degree of similarity satisfies a predetermined condition among the history information, presenting a combination pattern of the open and closed states of switches to which a reverse flow has been added, selecting an optimum combination pattern of switches, and switching the switches to suppress the power beyond a tolerance range of voltage from flowing.

2. The power distribution management apparatus according to claim 1, wherein
    the attribute information contains a date classification, a time, a temperature, and the amount of solar radiation, and
    the calculating includes calculating the degree of similarity between the specified date classification, time, temperature, and amount of solar radiation, and the date classification, time, temperature, and amount of solar radiation contained in the history information.

3. The power distribution management apparatus according to claim 2, wherein
    the attribute information further contains the number of customers possessing a distributed energy resource, or a total value of power generation capacity of distributed energy resources, and
    the calculating includes calculating the degree of similarity between the number of customers possessing a specified distributed energy resource and the number of customers possessing a distributed energy resource contained in the history information, or calculates the degree of similarity between the total value of power generation capacity of specified distributed energy resources and the total value of power generation capacity of distributed energy resources contained in the history information.

4. The power distribution management apparatus according to claim 1, wherein
the memory is configured to store the history information associated with a pattern of a power supply path formed by setting an open/closed division corresponding to a conductive/non-conductive state for each switch included in a power distribution system equipment, a date classification indicating a workday or a holiday, and weather information including time, an amount of solar radiation, and temperature, and
the processor is configured to execute a process further including:
receiving a combination of a date classification and weather information;
extracting, from the history information in the memory, history information corresponding to the date classification included in the received combination;
calculating, for each the extracted history information, a degree of similarity based on differences in time, an amount of solar radiation, and temperature, between the weather information included in the extracted history information and the weather information included in the received combination; and
extracting, from patterns of a power supply path included in the extracted history information, a pattern of a power supply path associated with the weather information having a predetermined number of calculated top-ranked degrees of similarity listed in a descending order.

5. The power distribution management apparatus according to claim 1, wherein
the processor is configured to execute a process further including:
creating power distribution system information containing a current node table and a current branch table, wherein
the current node table has retrieved, from among branches registered in the current node table, nodes of a power distribution system where pieces of equipment are electrically interconnected at a point of making a search, and
the current branch table is a table where branches of the power distribution system electrically interconnected at a point of making a search, and pieces of attribute information corresponding to the branches are associated after the retrieval of the branches and the pieces of attribute information from among the branches registered in the current branch table.

6. A pattern extraction method comprising:
upon acceptance of specification of attribute information related to an environment where power is supplied, calculating a degree of similarity between the specified attribute information and attribute information contained in history information including a pattern of open and closed states of switches that switch a path that supplies power between a substation and load equipment of a customer, and the attribute information related to the environment where the power is supplied, by a processor; and
extracting a pattern of the open and closed states of switches whose degree of similarity satisfies a predetermined condition among the history information, presenting a combination pattern of the open and closed states of switches to which a reverse flow has been added, selecting an optimum combination pattern of switches, and switching the switches to suppress the power beyond a tolerance range of voltage from flowing, by the processor.

7. The pattern extraction method according to claim 6, wherein
the attribute information contains a date classification, a time, a temperature, and the amount of solar radiation, and
the calculating includes calculating the degree of similarity between the specified date classification, time, temperature, and amount of solar radiation, and the date classification, time, temperature, and amount of solar radiation contained in the history information, by the processor.

8. The pattern extraction method according to claim 7, wherein
the attribute information further contains the number of customers possessing a distributed energy resource, or a total value of power generation capacity of distributed energy resources, and
the calculating includes calculating the degree of similarity between the number of customers possessing a specified distributed energy resource and the number of customers possessing a distributed energy resource contained in the history information, or calculating the degree of similarity between the total value of power generation capacity of specified distributed energy resources and the total value of power generation capacity of distributed energy resources contained in the history information, by the processor.

9. A non-transitory computer-readable recording medium having stored therein a pattern extraction program that causes a computer to execute a process comprising:
upon acceptance of specification of attribute information related to an environment where power is supplied, calculating a degree of similarity between the specified attribute information and attribute information contained in history information including a pattern of open and closed states of switches that switch a path that supplies power between a substation and load equipment of a customer, and the attribute information related to the environment where the power is supplied; and
extracting a pattern of the open and closed states of switches whose degree of similarity satisfies a predetermined condition among the history information, presenting a combination pattern of the open and closed states of switches to which a reverse flow has been added, selecting an optimum combination pattern of switches, and switching the switches to suppress the power beyond a tolerance range of voltage from flowing.

10. The non-transitory computer-readable recording medium according to claim 9, wherein
the attribute information contains a date classification, a time, a temperature, and the amount of solar radiation, and
the calculating includes calculating the degree of similarity between the specified date classification, time, temperature, and amount of solar radiation, and the date classification, time, temperature, and amount of solar radiation contained in the history information.

11. The non-transitory computer-readable recording medium according to claim 10, wherein the attribute information further contains the number of customers possessing a distributed energy resource, or a total value of power generation capacity of distributed energy resources, and the calculating includes calculating the degree of similarity between the number of customers possessing a specified distributed energy resource and the number of customers possessing a distributed energy resource contained in the history information, or calculating the degree of similarity between the total value of power generation capacity of specified distributed energy resources and the total value of power generation capacity of distributed energy resources contained in the history information.

* * * * *